(12) United States Patent
Critz

(10) Patent No.: US 7,605,814 B1
(45) Date of Patent: Oct. 20, 2009

(54) METHOD AND TOOL FOR VIEWING DATA

(75) Inventor: David Karl Critz, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 614 days.

(21) Appl. No.: 10/925,780

(22) Filed: Aug. 24, 2004

(51) Int. Cl.
*G06T 11/20* (2006.01)

(52) U.S. Cl. ..................................... 345/440
(58) Field of Classification Search ............... 345/440; 715/903, 215
See application file for complete search history.

(56) References Cited

U.S. PATENT DOCUMENTS

| | | | | | |
|---|---|---|---|---|---|
| 4,812,996 | A | * | 3/1989 | Stubbs | 702/123 |
| 5,319,777 | A | * | 6/1994 | Perez | 707/10 |
| 5,359,724 | A | * | 10/1994 | Earle | 707/205 |
| 5,619,631 | A | * | 4/1997 | Schott | 345/440 |
| 6,222,540 | B1 | * | 4/2001 | Sacerdoti | 345/581 |
| 6,707,454 | B1 | * | 3/2004 | Barg et al. | 345/440 |
| 2003/0030637 | A1 | * | 2/2003 | Grinstein et al. | 345/420 |

OTHER PUBLICATIONS

"The ABC's of Excel 97" second edition by Gene Weisskopf Published by Sybex Inc. copyright 1997 pp. 22,247-288.*
"LabView for windows user manual" by National Instruments copyright 1992 pp. 15-2, 15-11, 6-1 to 6-3.*
"Microsoft Excel" by Microsoft Corporation, 1993, 6 pages.*
Microsoft Excel by Microsoft Corporation, 1993, p. 7.*

* cited by examiner

*Primary Examiner*—Jeffery A Brier
(74) *Attorney, Agent, or Firm*—Lahive & Cockfield, LLP; Kevin J. Canning

(57) ABSTRACT

A method and apparatus are provided for viewing data from a data set. The data set can be a multiple dimensional data set having a tabbed like structure or alternatively having a grid like structure with no points spaced apart in at least two dimensions. The method and apparatus provide a user interface and a viewer tool that allows a user to select desired data from the data set and select desired plot types for viewing the selected data. The method and apparatus can select and view data from the data set that has one or more arbitrary dimensions.

51 Claims, 16 Drawing Sheets

METHOD AND TOOL FOR VIEWING DATA

TECHNICAL FIELD OF THE INVENTION

The present invention relates to plot generation, and more particularly, to plot generation of data from a multiple dimension data set in a selected plot type.

BACKGROUND OF THE INVENTION

Data is often stored in a table (matrix) format or in a multiple dimensional array format in a data storage device. Such a table or multiple dimension array is often referred to as a look-up table. Basic look-up tables or pages of data are two-dimensional and have a matrix or matrices like structure for the purpose of arranging sets of data in table form, such as in spreadsheets and look-up tables. Typically, each element of a matrix is a numerical quantity, which can be precisely located in terms of two indexing variables. At higher dimensions, multiple dimension data sets are represented as a collection of matrices or one or more cubes, whose elements are described in terms of a corresponding member of indexing variables.

Conventional viewers for multiple dimension data sets are suited for viewing a tabular representation of labeled tuples, for example, a table having tabbed columns of tuples accessible by a row index value and a column index value. In this instance, a tuple is an ordered set of values. Moreover, most conventional multiple dimension data viewers can view multiple pages of two-dimensional data or three-dimensional data, but require the data to have fixed dimensional limits in order to view the data. Nevertheless, other conventional multiple dimensional data viewers can view data from multiple dimensional data sets defined with arbitrary dimensionalities, although they are limited to viewing data from multiple dimension data sets having a tabular tuple data structure. A further burden of conventional multiple dimension data viewers is their requirement that the multiple dimension data set include scalar data, or character data. The conventional multiple dimensional data viewers cannot view non-scalar data at a given tuple index.

SUMMARY OF THE INVENTION

The illustrative embodiment of the present invention addresses the above-described limitations of the conventional methods for viewing and plotting data. The present invention provides an approach that allows a user to view data from a desired data set. The data set can have a one-dimensional structure, or a multiple dimensional structure. Suitable multiple dimensional structures include grid like structures having data points spaced apart in two or more dimensions and cell like structures. Moreover, the method and data viewer of the present invention is able to generate plots using non-scalar data from a data set. Further, the method and data viewer of the present invention provides an approach to viewing data from a data set having arbitrary dimensionalities as defined to the method or viewer.

In one embodiment of the present invention, a method is performed in a graphical modeling environment practiced in an electronic device. Performance of the method displays data from a data set to a user of the electronic device on a display device associated therewith. The method includes a step of selecting data from the data set for display on the display device. The data set is capable of containing scalar and non-scalar data. The method also includes a step of displaying the selected data in one of a number of plot types selected by the user.

In selecting data from the data set, the method can determine a number of data sections from the data set for use in creating the selected plot type. The method can further perform a step of defining at least one dimension of at least one of the data sections with a value selected by the user to identify at least a portion of one data section.

The method can select and display data from the data set having one dimension defined with an arbitrary value. Further, in the step of determining a number of data sections from the data set, the method can select a range of data, all the data from at least one data section, non-contiguous portions of at least one data section, or select a single data point from one of the data sections for displaying to the user in the selected plot type. Optionally, the graphical modeling environment can include a test executive for use in managing execution of code used for testing an operational feature of a unit under test (UUT). The data set can be a multiple dimension data set. Suitable multiple dimension data sets include data sets having a grid like structure having nodal points spaced apart in at least two dimensions and cell like structures.

In another embodiment of the present invention, a method is disclosed for viewing data from a data set. The method includes steps of selecting a plot type for viewing data from the data set and determining a sub-set of the data set for use in viewing the data based in the selected plot type. Other steps capable of being performed by the method include a step of generating a plot of the sub-set of the data set in the plot type selected and displaying the plot on a display device.

The data set can be a one-dimensional data set or can be a multiple dimension data set having a grid like structure with a plurality of nodal points spaced apart in at least two dimensions. In one or more implementations of the multiple dimensional data set, at least one of the nodal points includes a representation of non-scalar data. The data set can also be a multiple dimension data set having a grid like structure.

The step of determining a sub-set of the data set for use in viewing the data based on the plot type selected can include a step of selecting at least one coordinate location in the data set based on at least one input parameter to a viewer tool. The at least one coordinate can define a plane in the data set.

The method can further include a step of displaying status information to a user. The status information is usable to inform the user of a state of an operation being preformed by the viewer tool. The method can further include a step of displaying a legend for identifying one or more plots plotted by the viewer tool.

In one embodiment of the present invention, an electronic device for use in practicing a technical computing environment is disclosed. The electronic device includes an input device for use by a user of the electronic device and a viewer tool responsive to input from the user for generating a plot of data selected from a data set. The data set can be a one-dimensional data set or a multiple dimension data set having a grid like structure that includes a number of grid nodes spaced apart in at least two dimensions and at least one of the grid nodes can include non-scalar data. The multiple dimension data set can also have a cell based structure. The technical computing environment is well suited for developing and performing engineering and scientific related functions.

The electronic device further includes a display device for displaying the plot of the data selected from the data set. Further, the viewer tool is capable of rendering a user interface on the display device to allow the user to provide the viewer tool with the inputs using the input device. The user interface allows the user to select at least one independent input parameter for use by the viewer tool to identify data for plotting. The independent input parameter has a value independent of one or more other parameters associated with the data set. The user interface can also allow the user to select at least one dependent input parameter for use by the viewer tool to identify data for use in generating a plot. The dependent input parameter has a value dependent on one or more other parameters associated with the data set.

In yet another embodiment of the present invention, there is disclosed a device readable medium holding device executable instructions for performing a method for displaying data to a user of an electronic device on a display device associated therewith. The method includes steps of selecting data from a data set. The data set can be a one-dimensional data set or a multiple dimensional data set having a grid like structure and displaying the selected data in one of a number of plot types selected by the user. The multiple dimensional data set can also have a cell based structure. The data set is capable of containing scalar data and non-scalar data. The step of selecting data from the data set can include a step of determining a number of data sections from the data set for use in creating a selected plot type. Each data section being defined by a number of dimensions.

The device readable medium can further include a step of defining at least one of dimension of at least one of the data sections with a selected value to identify at least a portion of the one data section. At least one selected data section includes at least one dimension defined by an arbitrary value.

The device readable medium can also include steps of selecting a range of data from at least one data section, selecting all data from at least one data section, selecting non-contiguous portions of at least one data section, and selecting a single data point from one of the data sections.

In another embodiment of the present invention, there is disclosed a device readable medium holding device readable instructions for performing a method for viewing data from a data set. The method includes steps of selecting a plot type for viewing data from the data set and determining a sub-set of the data set for use in viewing the data based on the plot type selected. The method can further include steps of generating a plot of the sub-set of the data set from the plot type selected and generating the plot for viewing on a display device.

The data set can be a one-dimensional data set or a multiple dimensional data set. One suitable multiple dimensional data set has a grid like structure with a number of nodal points spaced apart in at least two dimensions. At least one of the nodal points can include a representation of non-scalar data. Another suitable multiple dimensional data set has a cell based structure.

The step of determining a sub-set can include a step of selecting at least one coordinate location in the data set based on at least one input parameter to a viewer tool. The at least one coordinate can define a plane in the data set. Further, performance of the method can display status information to a user. The status information informs the user of a state of an operation performed by the viewer tool. Performance of a method can further display a legend for identifying one or more plots displayed.

BRIEF DESCRIPTION OF THE DRAWINGS

An illustrative embodiment of the present invention will be described below relative to the following drawings.

DETAILED DESCRIPTION

Before proceeding with the detailed discussion below it is first helpful to define a few terms used throughout the specification and claims.

The term "graphical modeling environment" refers to a modeling environment that may also include testing or simulation capabilities, adaptable to use a set of graphical blocks (or nodes) and a set of lines (or signals) that carry data between the graphical blocks. Each graphical block typically performs a function and that function (or equation) is a sub-component of an overall set of equations describing a dynamic system. The function may be mathematical in nature or it may be an operation such as reading data from a hardware device. The graphical blocks can be parameterized with user-defined values.

The term "test executive" refers to a software program capable of launching, editing, debugging, managing and recording data for programs designed to test an operational feature of a unit under test (UUT). The test executive is capable of interfacing with instrumentation having a bus such as the general purpose interface bus (GPIB).

The illustrative embodiment of the present invention provides a method and a viewer tool for viewing data from a data set. The data set can be one-dimensional or multiple dimensional. Suitable multiple dimensional data sets can have a grid like structure or a cell based structure. Through the use of a user interface, the method and viewer tool allows a user to select data from the data set by identifying a first dimension along a first axis of the data set and foregoing the setting of a second dimension along a second axis of the data set. The data set suitable for use with the present invention can include scalar data and non-scalar data. As such, the method and viewer tool of the present invention is able to view and plot both scalar and non-scalar data. Further, the method and viewer tool are well suited for use with partially populated data sets. More specifically, the method and viewer tool are able to plot data from a partially populated data set and update the plot at desired intervals if so desired as the data set becomes populated with updated data.

Figure 1:
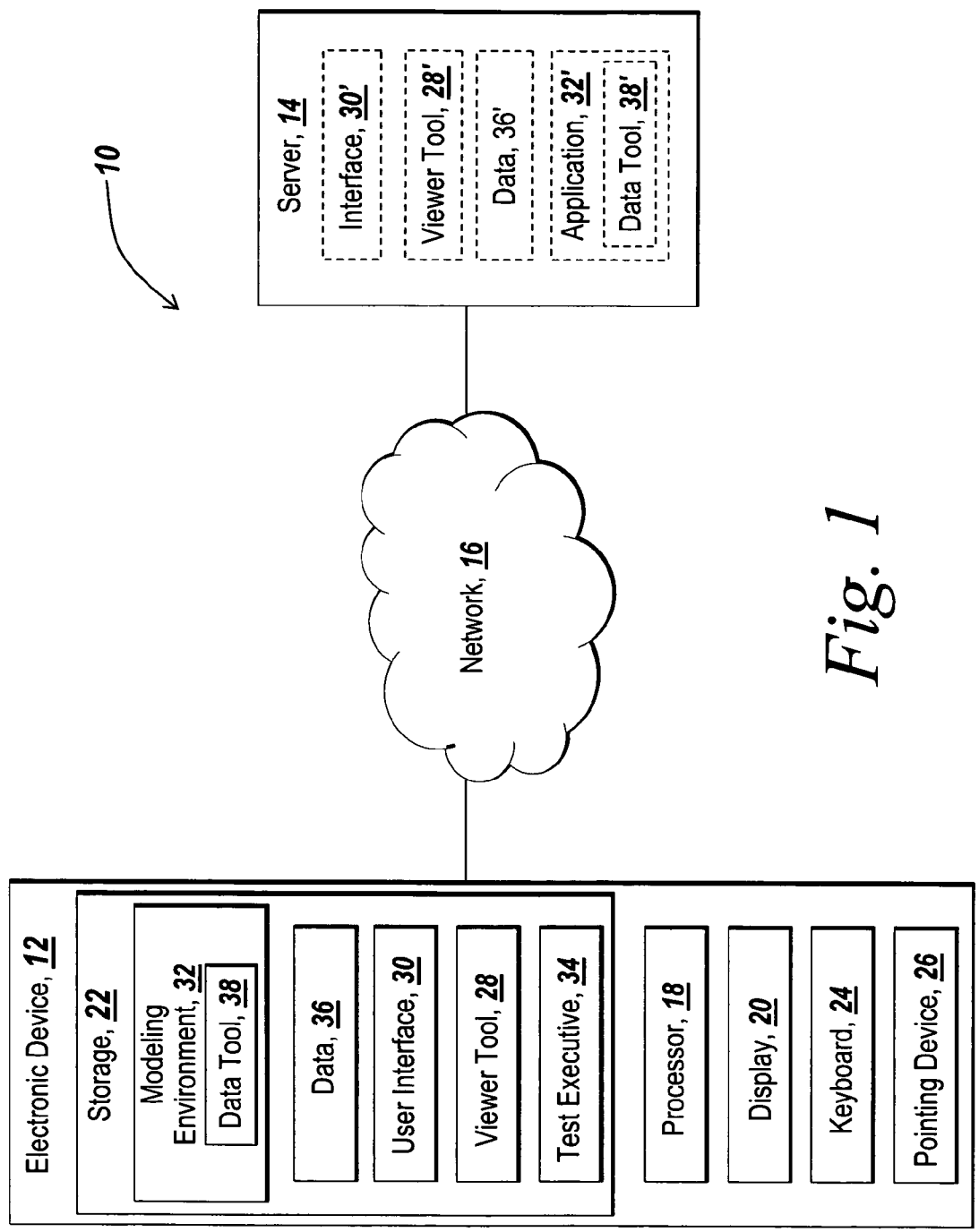
FIG. 1 is an exemplary block diagram illustrating an environment suitable for practicing an illustrative embodiment of the present invention.

FIG. 1 illustrates an environment suitable for practicing the illustrative embodiment of the present invention. A computer system 10 includes an electronic device 12, a network 16, such as the Internet, an intranet, or other suitable network either wired, wireless, or a hybrid of wired and wireless and, optionally, a server 14 or other network device or electronic device. The electronic device 12 includes a processor 18 for executing various instructions and programs, and controlling various hardware and software components. The electronic device 12 also includes a display device 20 for use in rendering textual and graphical images, a storage device 22 for storing various items such as data, information, and programs. A keyboard 24 and a pointing device 26 are also included with the electronic device 12. The pointing device 26 includes such devices as a mouse, trackball, or light pen. Those skilled in the art will recognize that the pointing device 26 can be incorporated with the display device 20 to provide the electronic device 12 with a touch screen that allows the user to interact with the electronic device 12 with a stylist or other means such as a user's finger.

The storage device 22 includes a graphical modeling application environment 32 for use in developing and executing block diagram models. One suitable graphical modeling environment for use in practicing the illustrative embodiment of the present invention is Simulink® from MathWorks, Inc. of Natick, Mass. Nevertheless, those skilled in the art will appreciate that the features of the illustrative embodiment of the present invention described above and below are equally applicable to other graphical modeling environments for example, LabView, System View, Signal Processing Workstation, HyperSignal, COSSAD, PTOLEMY, and other like block diagram environments. The storage device 22 and hence the electronic device 12 further includes user interface 30, viewer tool 28, test executive 34, data set 36, and data tool 38.

Data tool 38 is operable in the graphical modeling application environment 32 to receive data from a unit under test or a plant being modeled, or other like mechanism such as, a data acquisition mechanism, and update the contents of data set 36. Data set 36 can take the form of a number of suitable data structures. Exemplary details of the operations and functions performable by the data tool 38 are discussed below in relation to FIGS. 2-6.

The user interface 30 in conjunction with the viewer tool 28 provides a user of the system 10 with textual and graphical information that allow a user to browse and plot data from data set 36 in a desired plot type. The user interface 30, from a user's perspective, is discussed below in more detail with reference to FIGS. 8-12.

Server 14 is coupled to network 16 and includes graphical modeling application environment 32', user interface 30', viewer tool 28', and data set 36'. In this manner, a number of users are able to access the graphical modeling application environment 32', user interface 30', viewer tool 28', and data set 36' via the network 16 without the need to have each user running a local copy of one or more the graphical modeling application environment 32, user interface 30, viewer tool 28, or to include a local copy of the data 36. Those skilled in the art will recognize that the electronic device 12 includes other software such as, other user interfaces and other programs, such as one or more OS programs, compilers and various other program applications developed in a variety of programming environments for controlling system software and hardware components.

Figure 2:
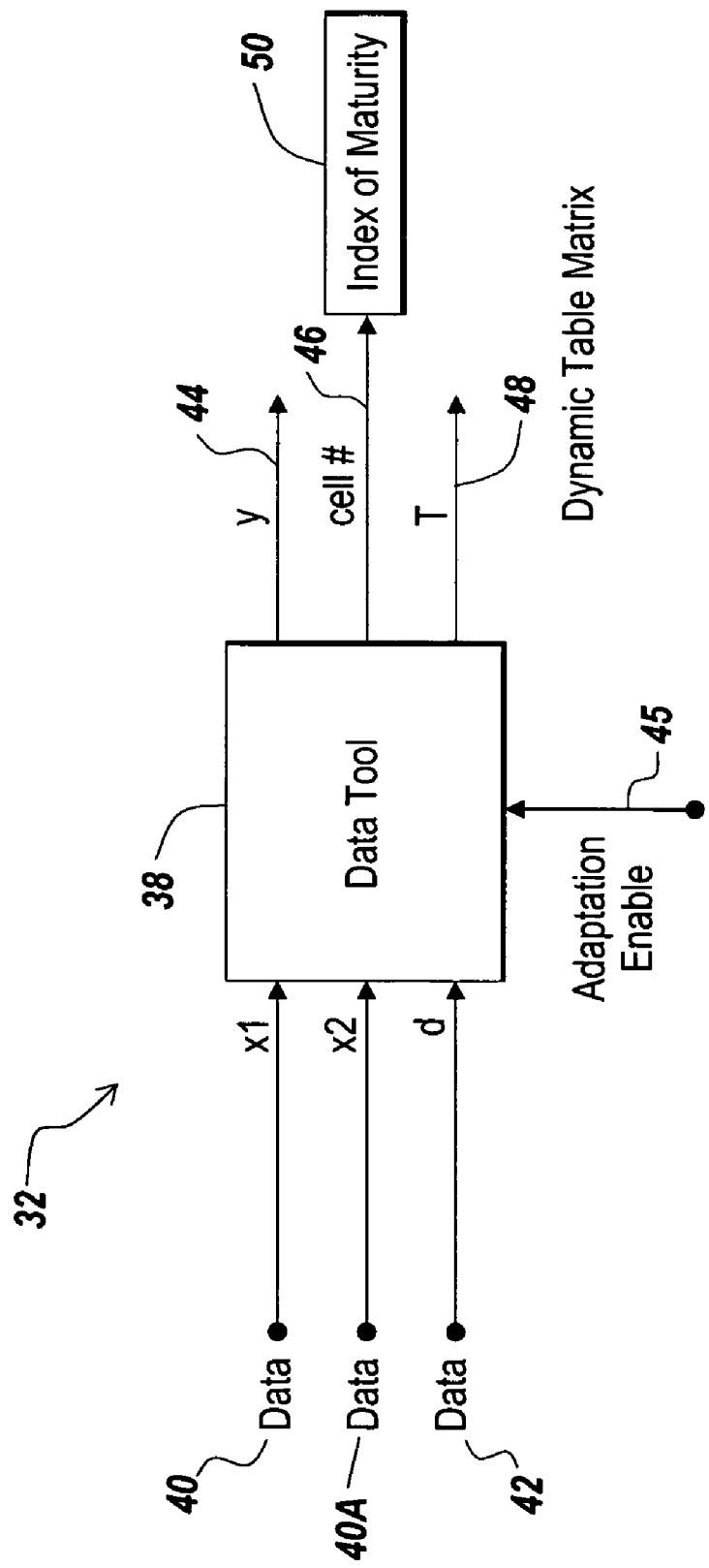
FIG. 2 illustrates an exemplary graphical modeling block suitable for use in practicing the illustrative embodiment of the present invention.

FIG. 2 illustrates the data tool 38 in more detail. The data tool 38 is adaptable to receive a number of data inputs and a number of data types. The data tool 38 uses the received data to create and update the contents of the data set 36. More specifically, the data tool 38 uses data 40 to locate table (array) elements by comparing the values of data 40 with breakpoints defined for each indexing variable, and uses data 42 to update the values of the array elements. Thus, the data tool 38 continuously improves the contents of the data set 36 over time. This continuous improvement of the data set 36 is referred to herein as data set adaptation. The data set adaptation process can involve complex statistical and signal processing algorithms to capture the time-varying data representative of a UUT or a plant, or other like controllable object. Additional details of the data tool 38 will be described in further detail later.

The data tool 38 implements an array of table elements and maps the table elements to one or more sets of indexed values or "breakpoints", typically non-repeating, monotonically increasing values. The breakpoints are the values at which the relationship which the table has sampled is evaluated for a given index. The breakpoints define intervals or segments in which the input value(s) may fall. The blocks determine the location of the input value relative to one of the intervals and use that location to locate the elements and their corresponding table data values. The table values can represent either scalar data or non-scalar data. The input values that fall outside these intervals are handled as well. They can be ignored or processed by the data tool 38, e.g., treated as if falling within an end interval.

The breakpoints of a lookup table serve to partition the table input space into regions referred to as "cells". Each cell, which can be multiple dimensional, is delimited by two breakpoints for each indexing variable.

In one form of table lookup, the values of the table are associated with respective cells in the table. Thus, for example, a two dimensional table might have a cell that corresponds to the intervals (4, 5) for a first variable $x_1$, and (7, 8) for a second variable $x_2$. In such a table, input values within those ranges (e.g., $x_1$=4.2 and $x_2$=7.5) would result in the value of that cell being generated as the output of the lookup table. This type of table lookup is referred to as cell-based lookup.

In another form of table lookup, the values stored in the lookup table are associated with specific intersections of input variables. For example, in a two-dimensional table, a specific value might be associated with the input values of $x_1$=4 and $x_2$=7, and a different value might be associated with the point at which $x_1$=4 and $x_2$=8, at which $x_1$=5 and $x_2$=7, and at which $x_1$=5 and $x_2$=8. In such a table, output values for input values that fall between such defined points (i.e. $x_1$=4.2 and $x_2$=7.5) can be generated by interpolation of the values associated with the specific points that surround the given point. This type of table lookup is referred to as a point-based lookup.

In one embodiment, the table lookup is a cell-based table lookup and the data set adaptation in conjunction with user interface 30 uses a cell-based table lookup. In the cell-based data set adaptation, output data generated by the UUT, the plant or modeled object for given input data is used to update a cell value for the particular cell determined by the table lookup for that input data directly, and that adapted cell value is readable by the viewer tool 28 for use in generating a plot in a selected plot type. In a second embodiment, the table lookup is point-based and the data set adaptation uses a point-based table lookup. In the case of the point-based adaptation, the output data generated by the UUT, the plant or modeled object is used to update the values of the grid points around that cell, and these adapted points (values) are then used to interpolate the exact point at the position identified by the input data to the UUT, the plant or modeled object. The interpolated point can be provided to the viewer tool for use in generating a plot in a selected plot type. Both of these embodiments are described in further detail below.

The data tool 38 presents one abstraction of a lookup table generation and adaptation process to a high-level user interface, for example user interface 30. The data tool 38 can be inserted into a physical system model in the graphical modeling environment 32 and provide the necessary connectivity with other simulation blocks in the overall model. Once the user places the graphical simulation block into the larger simulation model, the inputs and outputs of this component can be connected with other components in the model.

In the illustrated embodiment, the data tool 38 receives data, for example, data 40 and data 42 as inputs. In one embodiment, data 40 represents input data to a UUT, a plant or other modeled object, and data 42 represents output data generated by the UUT, the plant or other modeled object. An example of the type of data represented by data 40 includes coordinate data. An example of the type of data represented by data 42 includes output measurements. For example, the UUT, plant, or other modeled object represents an engine and a user wishes to create a lookup table to model behavior of the engine's efficiency as a function of engine RPM and manifold pressure, then the plant input data values $x_1$ and $x_2$ represented by data 40 and data 40A, respectively, would correspond to values of RPM and manifold pressure, respectively, and the value of plant output data "d" represented by data 42 would correspond to the measured value for efficiency. In the exemplary embodiment of FIG. 2, the data tool 38 is configured to perform a two-dimensional lookup table, but can be configured to accommodate any number of inputs "x" to populate multiple dimension data sets having a cube like structure.

Figure 9:
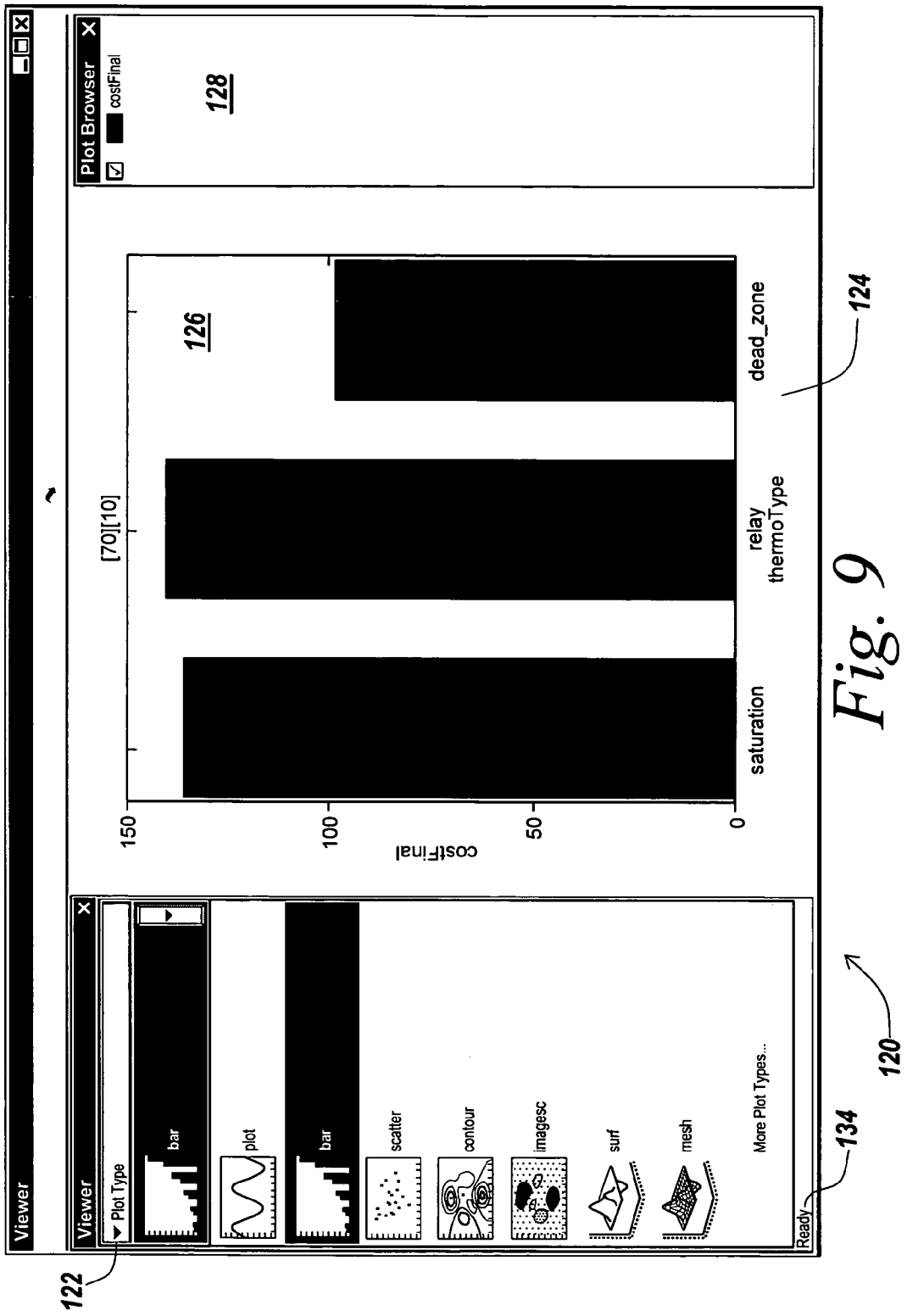
FIGS. 9-13 depict an exemplary windows of the user interface provided by the illustrative embodiment of the present invention.
Figure 11:
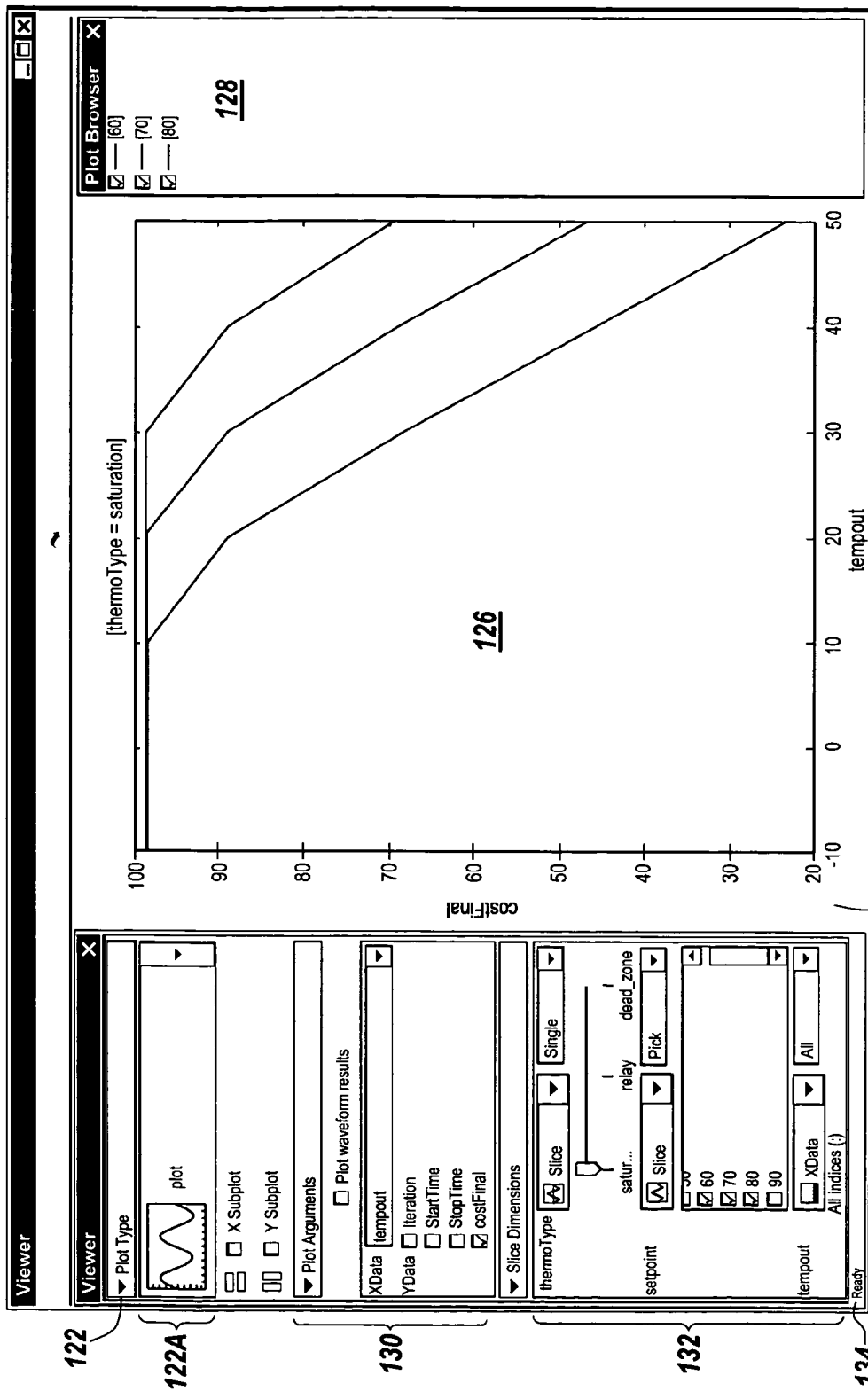

The outputs of the data tool 38 include a currently adapted table output value "y" 44, an index number of the currently adapted lookup table cell (i.e., cell number 46), or indices of points around the cell, and, if required, post-adaptation table data "T" 48. The table data output 48 may be useful for viewing the table contents in the model window or generating surface plots, as shown in FIGS. 9 and 11.

The cell number 46 is useable for different purposes. For example, and as shown in FIG. 2, it can be used to maintain an index of maturity block 50. The index of maturity block 50 counts how many output data points the table has received within a particular cell. Thus, the index of maturity block 50 tells the user something about the precision of the table values: the more points within a table cell, the more precise is the adapted value for that cell. The cell number can also be used to track which points in the table are being adapted. If a specific test is designed to generate data in a special order, then the cell number could be compared with the expected order to ensure that that special order is followed.

When a graphical class is used in a model created in the graphical modeling environment 32, it is said to be instantiated, i.e., an instance of the graphical class is created for use in the model. Such an instance is a link to the graphical class that resides in the storage device 22. The behavior of a block is definable in terms of parameters that the user specifies when creating an instance of the block. The behavior of the block is akin to the behavior of a template class as used in object oriented programming languages such as C++. Block parameters are class members that are specified when a user constructs a new instance of a class. Instances associated with the class have parameter specification interfaces that allow a user to set values for these block parameters. On the user interface 30 such parameter specification interfaces can take the form of a number of graphical elements such as, a dialog box with various parameter fields. Thus, the user can supply the block parameters to the block method for the appropriate block through a dialog box associated with the block. Alternatively, the user can specify parameter values programmatically using a textual based interface such as, a command line interface (CLI) or a menu driven interface. Thus, each block in a block diagram model created in the graphical modeling environment 32 can have parameters that are specified by a user for use in the block methods for those blocks.

When the test program for the UUT, or the model of the plant, or the model of the physical object is executed, the data tool 38 begins to adapt to data inputs and copies to the table output y 44 is the value of the particular array element currently being updated 44 (cell-based) or value interpolated from the array elements being updated (point-based), the index number 48 representing the position of the adapted element(s) in the lookup table according to a user-defined numbering scheme (e.g., cell number), and, possibly, the adapted lookup table data 48 in its entirety.

Once the table is set up and initialized (via the user-specified block parameter values), the execution of the model causes adaptation algorithms defined for the block to begin learning the unknown values of the lookup table elements. These algorithms use the input and output measurements of the UUT or modeled object behavior to dynamically create and update the contents of the lookup table. Eventually, after a sufficient number of input values has been received so as to populate a sufficient number of cells or points in the table with stable values, a user may choose to disable the adaptation process and utilize the table as a static table. Thus, in the embodiment described thus far, the simulation process serves to capture a model of the physical object or UUT in the form of a lookup table.

Alternatively, although not shown, the data tool 38 can be used in a model of a plant having an adaptive lookup table as part of its functionality. That is, rather than receiving data from a physical plant or system, the adaptive lookup table could receive data from other functional blocks in a block diagram model. In this latter scenario, a simulator of the graphical modeling application environment 32, in executing the block diagram model, would simulate the behavior of the overall system, including the adaptive lookup table (as graphically represented by the data tool 38). In such an application, the block's inputs would be fed by other functional component blocks in the model, that is, the inputs would receive simulated plant data, and thus the electronic device 22 would not require use of internal or external plant data acquisition software or hardware.

In general, the data tool 38 operates as follows. When the adaptation mechanism is disabled by signal 45, the data tool 38 acts as a standard static lookup table, providing table output values y 44 in response to received input values $x_1$ and $x_2$. When the adaptation mechanism is enabled by signal 45, the data tool 38 takes the following steps. It receives the plant input values $x_1$ and $x_2$ and UUT or modeled object output value d 42. It then determines what, if any, stored values already in the table would be relevant for determining the table output value y 44 corresponding to the input values $x_1$ and $x_2$. In other words, in the cell-based embodiment, it determines the value of the cell corresponding to input values $x_1$ and $x_2$, whereas in the point-based embodiment, it determines the values of points immediately surrounding the point defined by input values $x_1$ and $x_2$. It then uses the output data d 42 to modify the existing relevant value(s) in the table. Finally, it generates an output based on the newly updated table value(s), which is provided on table output y 44.

Various techniques can be utilized to modify existing table values using output data d 42. One method would be to replace the existing values with the newly received plant output data d 42. However such a technique would, under some conditions, create inaccuracies due to noise on the input. Therefore, as input values $x_1$ and $x_2$, and output values d 42 are received by data tool 38, it is desirable that the table respond in a robust and noise tolerant way, while rapidly adapting to changing output values. Thus, the adaptation algorithms utilize various statistical and signal processing methods for robust, noise tolerant, and fast adaptation of the lookup table data. Since the data tool 38 and the user interface 30 provide a high-level interface to user inputs and encapsulate the statistical computations, the complex decision and adaptation mechanisms may be transparent to the user. The details of these mechanisms will now be described in detail.

Figure 3:
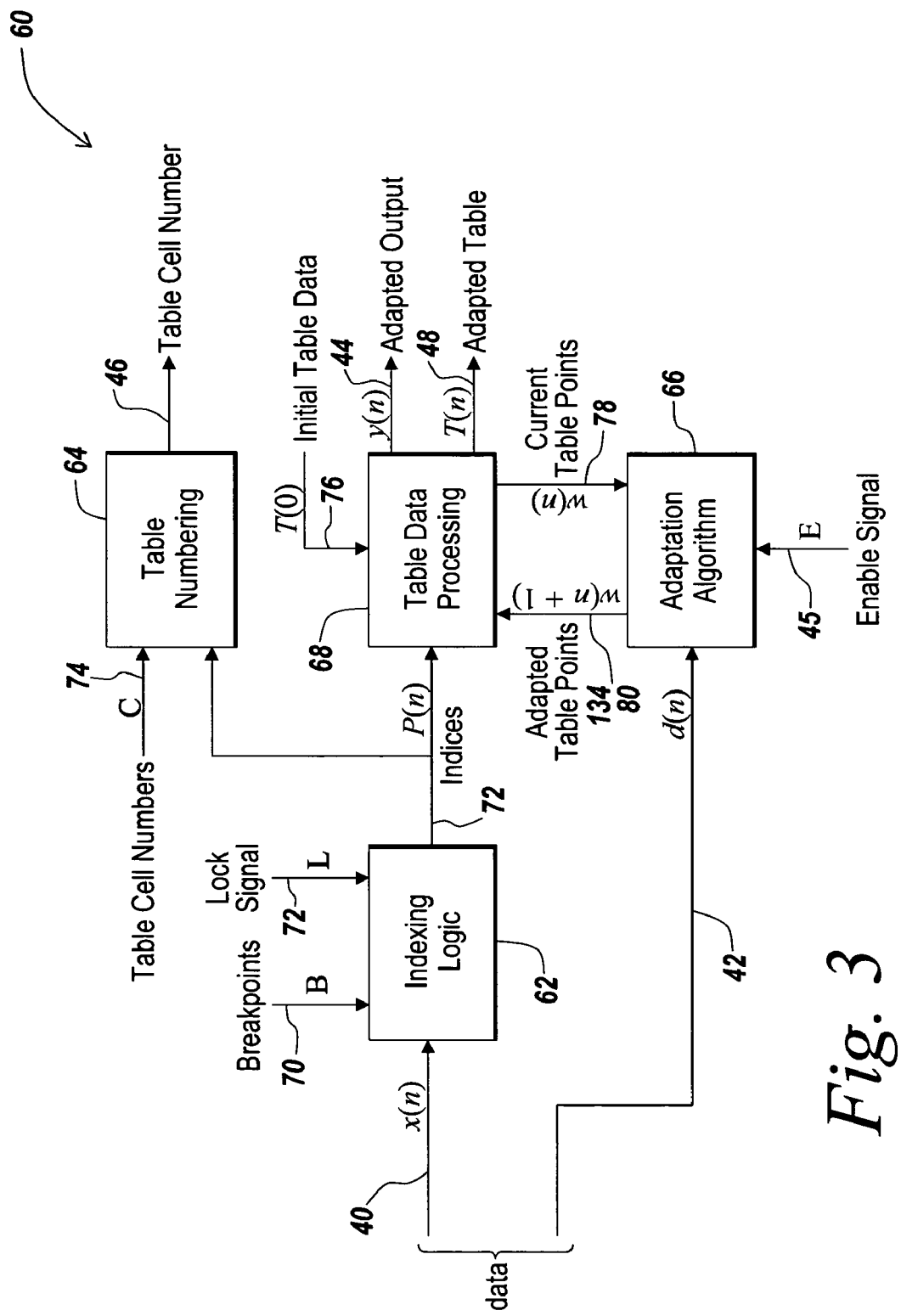
FIG. 3 illustrates the exemplary graphical modeling block in FIG. 2 with more detail.

Referring to FIG. 3, a lookup table generation and adaptation process 60 defined for the data tool 38 is shown. In the figure, small letters denote numbers (e.g., d(n)), bold small letters denote vectors (e.g., x(n)), capital letters denote sets (e.g., P(n)), and capital bold letters denote multi-dimensional tensors (or arrays) (e.g., T(n)). In the embodiment shown, the process 60 includes four functional components: indexing logic 62, table numbering 64, adaptation algorithm 66 and table data processing 68. The indexing logic 62 receives as inputs the breakpoints 70, the lock signal 72 (optionally) and the input data 40, represented here as an input vector at time n, "x(n)". For a number of plant inputs "l" the input vector is $x(n)=[x_1(n), \ldots, x_l(n)]^T$. For x(n), the corresponding output data 42 (either measured or simulated, as discussed above), is also represented as a vector at time n, as is "d(n)". The output d(n) 42 is provided to the adaptation algorithm 66.

The indexing logic 62 uses x(n) 40, breakpoints 70 and lock signal 72 (if used) to generate indices P(n) 72. The indices 72 are provided to the table numbering 64 and the table data processing 68. The table numbering 64, which also receives the table cell numbers 74 (from the user block parameter dialog input), uses the cell numbers 74 and the indices 72 to select from the cell numbers 74 the cell number corresponding to the indices 72. The table data processing 68 receives the initial table data 76 (from the user block parameter dialog input), and uses the indices 72 to determine an element or elements at the corresponding table cell location. That element is the element to be updated to take into account the new data, that is, d(n). Thus, the table processing 68 provides the currently stored element or elements 78 to the adaptation algorithm 66, which adapts each element value according to a particular algorithm, as will be described below, and returns the adapted value of that element or elements to the table data processing 68. The table data processing 68 stores the adapted value. The table data processing 68 provides an adapted plant output value as the table output 44, represented as output y(n) 44 at time n. In the cell-based embodiment, y(n) 44 is the same as the stored adapted value, that is, the adapted cell value. In the point-based embodiment, once the element (grid point) values are adapted, an interpolation is performed using the adapted points to determine the adapted output value y(n) 44. If the table data output 44 is configured by the user, then the table data processing 68 also provides as an output the table data 48, or T(n), which incorporates the results of the current adaptation iteration.

For each plant input, $x_i$, there is a corresponding vector of breakpoints $b_i$, with $k_i$ elements, which grids the input space in the $i^{th}$ dimension. The set of all breakpoints which grid the l-dimensional input space is given by $$B=\{b_i \in R^{ki} | k_i \in N, i=1, \ldots, \}, \quad (1)$$

where each $b_i=[b_i(1), \ldots, b_i(k_i)]^T$.

Given the input vector x(n), the set of indices, P(n), is determined so that each index within the set locates the input value $x_i(n)$ within the corresponding vector of breakpoints, $b_i$. That is, $$P(n)=\{p_i(n) \in N | b_i(p_i) \leq x_i(n) \leq b_i(p_i+1), i=1, \ldots, l\}. \quad (2)$$

The vector of indices p(n) is obtained by ordering the set P(n):

$$p(n)=[p_1(n), \ldots, p_l(n)]^T. \quad (3)$$

The corresponding set of fractions and the vector of fractions are given by $$F(n)=\{f_i(n) \in R | x_i(n)=(1-f_i(n))b_i(pi)+f_i(n)b_i(p_i+1), \quad i=1, \ldots, l\}, \quad (4)$$

and $$f(n)=[f_1(n), \ldots, f_l(n)]^T. \quad (5)$$

The set of indices P(n) corresponding to an input x(n) at time n is used to select m elements of the current table data T(n):

$$W(n)=\{w_j(n) \in R | w_j(n)=w_j(n;P(n)), j=1, \ldots, m\}, \quad (6)$$

where the number m depends on the type of adaptation scheme that is used. The set W(n) contains those elements of the table T(n) that will be adapted in the current iteration. The ordered set of elements of W(n) is represented by the vector w(n):

$$w(n)=[w_1(n), \ldots, w_m(n)]^T. \quad (7)$$

The adaptation scheme uses the vector w(n) and the plant output d(n) to generate the table output, y(n), an estimation error e(n) and the new table element values w(n+1):

$$y(n)=w^H(n)u(n) \quad (8)$$

$$e(n)=d(n)-y(n) \quad (9)$$

$$w(n+1)=w(n)+h(w(n),e(n),u(n)), \quad (10)$$

where the form of the vector u(n), and the vector function h(•) depend on the adaptation method used.

Figure 4:
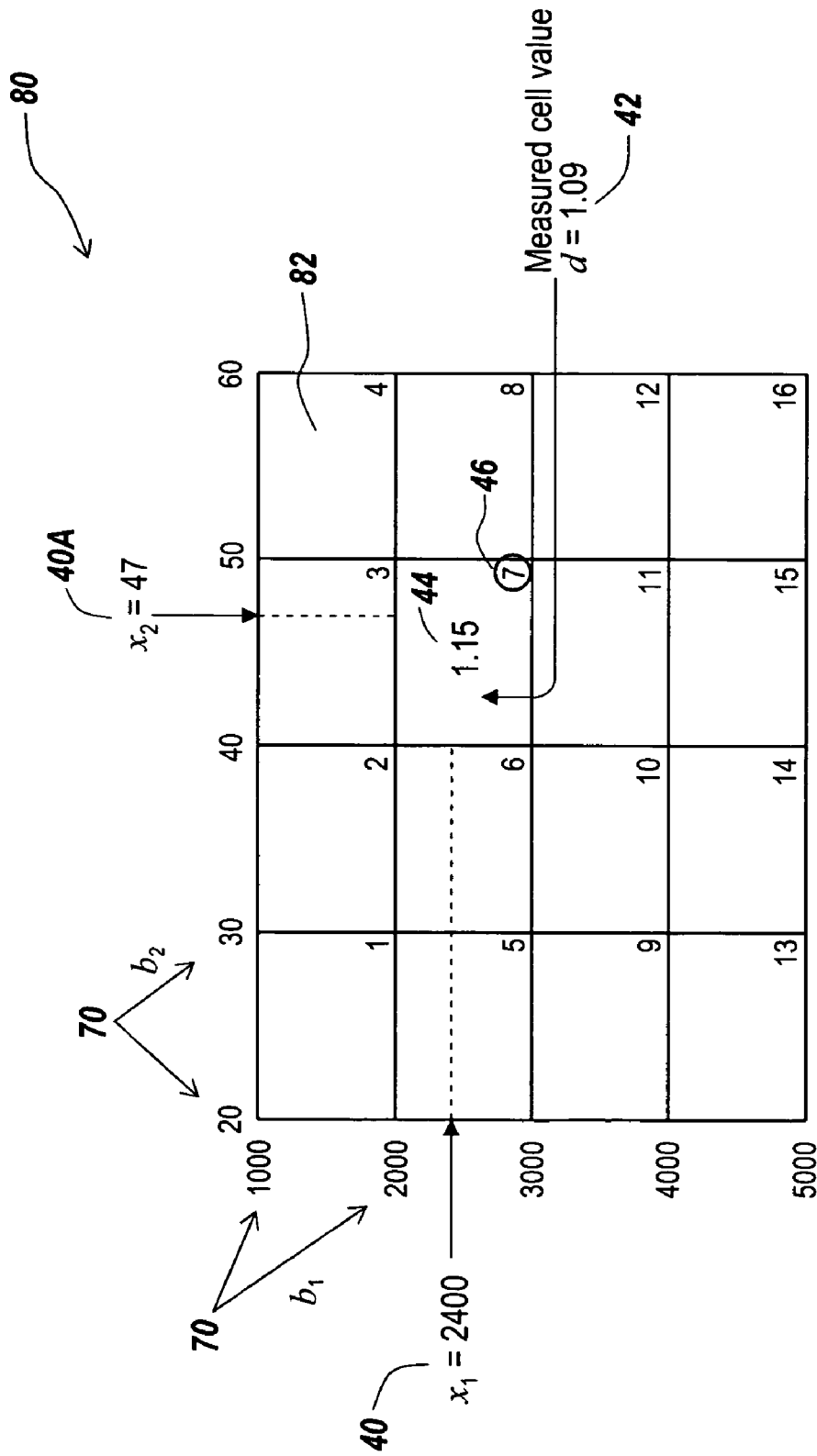
FIG. 4 depicts a portion of an exemplary multiple dimension data set having a cell like structure suitable for use in practicing the illustrative embodiment of the present invention.

In the cell-based embodiment, each element of the lookup table T(n) stores a numeric value corresponding to a particular cell. FIG. 4 illustrates an example of a two-dimensional table 80 of cells 82 (as defined by the breakpoints 70). In the cell-based adaptation scheme, each cell 82 has an adaptation weight, which depends on the specific adaptation algorithm used. If the current operating point ($x_1$, $x_2$) lies within a cell, that cell is adapted using the corresponding plant output data "d" 66. The particular cell is located by comparing the input data with the breakpoints 70 of the corresponding indexing variables. In the example shown, a pair of input data ($x_1=2400$, $x_2=47$) is used to locate the corresponding cell to be updated. The adapted cell value "y" 44 and the cell number 46, that is, the values of 1.15 and 7, respectively, are the outputs of the lookup table. The cell value can be used for control, whereas the cell number can be used as an indicator of the current operating point for the user or other logic. Various adaptation algorithms used to update the cell value are discussed below.

One type of adaptation algorithm that employable in a cell-based embodiment is Recursive Sample Mean (RSM). For the cell-based embodiment, the sample mean is defined as $$y(n) = 1/n \sum_{i=1}^{n} d(i), \quad (11)$$

and provides the average value of n output data samples, where each d(i) is the $i^{th}$ measurement collected within a particular cell. For each input data pair $(x_1, x_2)$, the sample mean at the corresponding operating point (cell) is updated using the output data measurement, d.

In practice, instead of accumulating n samples of data for each cell, a recursive relation is used to calculate the sample mean. A recursive expression can be obtained from the definition (11) as follows:

$$\begin{aligned} y(n) &= 1/n \left[ \sum_{i=1}^{n-1} d(i) + d(n) \right] \\ &= (n-1)/n \left[ 1/n - 1 \sum_{i=1}^{n-1} d(i) \right] + (1/n) * d(n) \\ &= (n-1)/n[y(n-1)] + (1/n) * d(n) \end{aligned} \quad (12)$$

where d(n) is the $n^{th}$ data sample.

Using an estimation error defined as e(n)=d(n)−y(n−1), the recursive relation (12) can be written as $$y(n)=y(n-1)+(1/n)*e(n), \quad (13)$$

where n≧1 and the initial estimate y(0) is arbitrary. In this expression, only the number of samples, n, for each cell has to be stored in memory, instead of storing n data samples required in Equation (11). A further simplification is possible by reformulating the recursion (13) as $$w(n)=w(n-1)+1,$$

$$y(n)=y(n-1)+e(n)/w(n), \quad (14)$$

where w(n) is the recursive adaptation weight with initial value w(0)=0.

The recursive mean algorithm defined in Equation (13) has an infinite memory so that the past data samples have the same weight as the final sample in the calculation of the sample mean. In contrast, an RSM algorithm with a forgetting factor puts more weight on the more recent samples and has robustness against initial response transients of the modeled object or the UUT. In addition, the forgetting factor provides an adjustable speed of adaptation. The recursive sample mean with forgetting factor is defined as $$\begin{aligned} y(n) &= 1 / \left[ \sum_{i=1}^{n} \lambda^{n-i} \right] \left[ \sum_{i=1}^{n} \lambda^{n-i} d(i) \right] \\ &= 1 / \left[ \sum_{i=1}^{n} \lambda^{n-i} \right] \left[ \sum_{i=1}^{n-1} \lambda^{n-i} d(i) + d(n) \right] \end{aligned} \quad (15)$$

where λ∈[0,1] is the forgetting factor and $$s(k) = \sum_{i=1}^{k} \lambda^{n-i}.$$

Using the estimation error defined as e(n)=d(n)−y(n−1), the recursive relation (15) can be written as $$y(n)=y(n-1)+[1/s(n)]*e(n)=y(n-1)+[(1-\lambda,)/(1-\lambda^n)]*e(n) \quad (16)$$

where n≧1 and the initial estimate y(0) is arbitrary. It should be noted that a small value for λ results in faster adaptation. A further simplification is possible by reformulating the recursion (16) as $$w(n)=\lambda w(n-1)+1,$$

$$y(n)=y(n-1)+e(n)/w(n) \quad (17)$$

where w(n) is the recursive adaptation weight with initial value w(0)=0.

The Recursive Sample Mean and the Recursive Sample Mean with Forgetting Factor adaptation techniques discussed above are equivalent to the well-known Recursive Least Squares (RLS) algorithm in one dimension, where the variable k(n)=1/w(n) is the gain vector.

Figure 5:
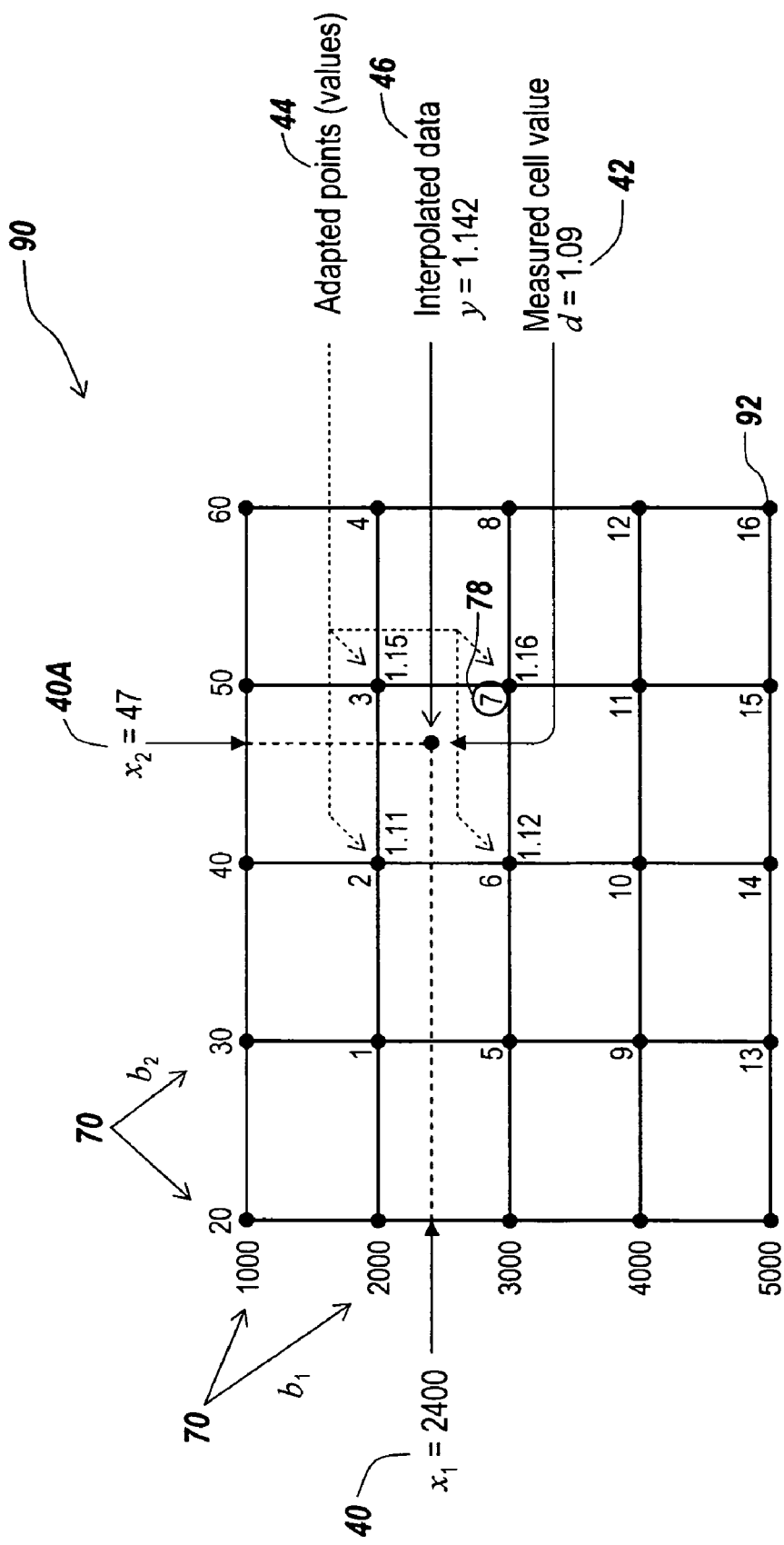
FIG. 5 depicts a portion of another exemplary multiple dimension data set having a grid like structure suitable for use in practicing the illustrative embodiment of the present invention.

In a point-based embodiment, each element of the lookup table stores a numeric value corresponding to a particular point which is a location in the multi-dimensional space defined by the breakpoints of the indexing variables. FIG. 5 illustrates an example of a two-dimensional point-based lookup 90, where each dot represents a point 92. The two-dimensional point-based lookup 90 represents a portion of a three-dimensional data set having a cube like structure. In the point-based embodiment, each point has an adaptation weight, which depends on the specific adaptation algorithm used. If the current operating point $(x_1, x_2)$ lies within a cell, the points that define the boundaries of that cell are adapted (adapted point values 44) according to where the operating point is located relative to the measured data, shown in the example as d=1.09. The particular cell is located by comparing the input data 40 and 40A with the breakpoints 70 of the corresponding indexing variables. In the example shown, a pair of input data $(x_1=2400, x_2=47)$ 40 and 40A and the adapted points around this operating point 44 are shown in the figure. The value of the "adapted" operating point 44 (y=1.82), which is found by interpolation of the adapted (neighboring) table points, and the cell number 46 are the outputs. The interpolated point table output value 44 is used for control, whereas the cell number 46 is used as an indicator of the current operating point for the user or other logic.

The adaptation algorithms used to update the point-based lookup table values include, but are not limited to, the Least-Mean Squares (LMS) or Recursive Least Squares (RLS) techniques. The LMS technique uses the adaptation equations (8, 9, 10) with $$u(n)=u_m(n), m=2, \quad (18)$$

where $$u_i(n) = u_{i-1}(n) \otimes \begin{bmatrix} 1 - fi(n) \\ fi(n) \end{bmatrix}. \quad (19)$$

In equation (19), the symbol $\otimes$ denotes the Kronecker product with $i \geq 1$ and $u_0(n)=1$.

The granularity of the breakpoints sets can be used to control the precision of the output y(n). Greater spacing between breakpoints results in a higher degree of datapoint compression, that is, in fewer cells. A reduced spacing between the breakpoints means more cells for a finer (more precise) representation of the plant output (surface).

It is also possible to incorporate into the block functionality logic that samples the modeled object or the UUT output data values, as they are made available for use by the data tool 38, thus selecting which of the values are used (or are not used) in the adaptation.

One of ordinary skill in the art will appreciate that the indexing and data structures described above in relation to FIGS. 4 and 5 are illustrative examples and the viewer tool of the present invention is well suited to operate with other indexing schemes or techniques and with other data structures having different schemes for organizing data. One of ordinary skill in the art will also appreciate that the data tool described in relation to FIG. 3 is one illustrative example of a data tool well suited for use with the data structures and indexing scheme illustrated in FIGS. 4 and 5, and the data tool may take any other suitable form or structure that can write or populate an associated data structure with data.

Figure 6:
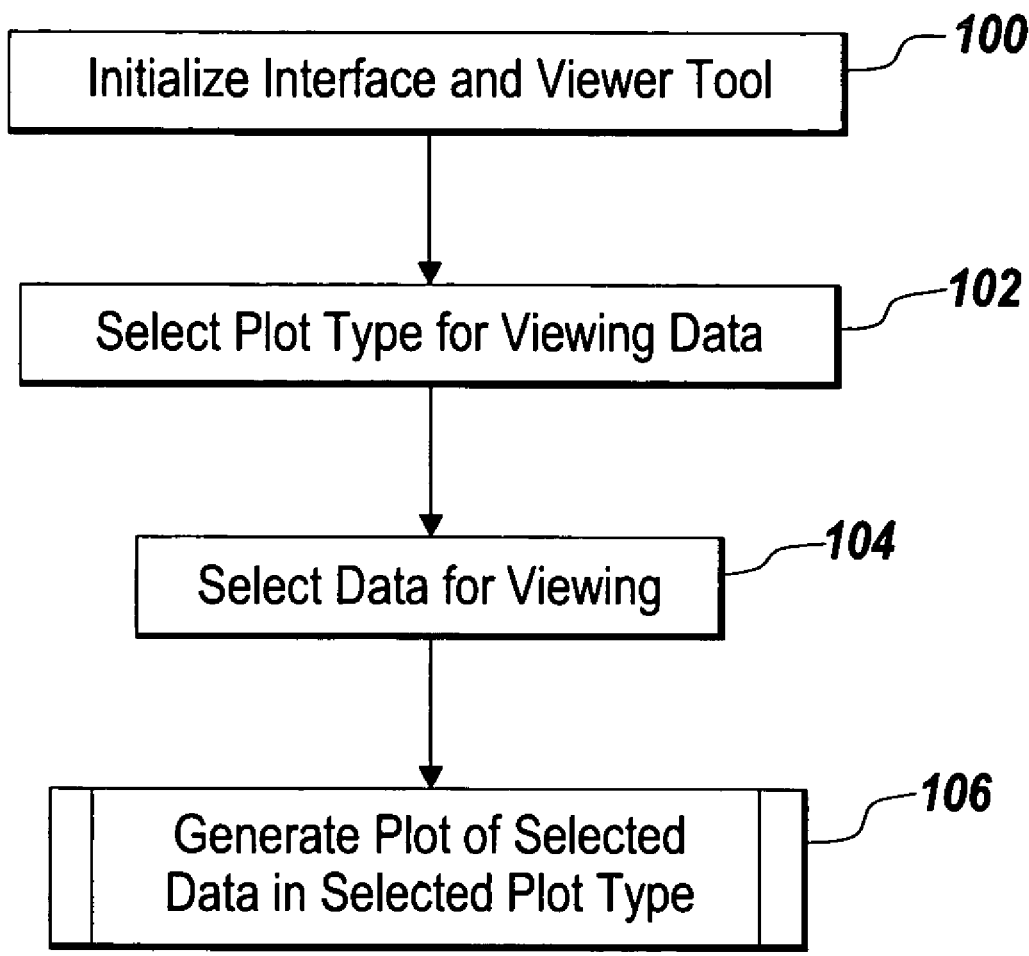
FIG. 6 is an exemplary flow chart that provides an overview of steps taken to practice the illustrative embodiment of the present invention.

FIG. 6 illustrates steps taken to practice an illustrative embodiment of the present invention. The user of the system 10 upon determination that it is desirable to view data from the data set 36 initializes the user interface 30 and the viewer tool 28 by entering the appropriate command or request (Step 100). Once the user interface 30 and the viewer tool 28 are initialized, the user using the pointing device 26 or the keyboard 24 or a touch screen of the display device 20 if so equipped, begins selecting a plot type for viewing data from the data set 36 (Step 102). The user interface 30 and viewer tool 28 can display via the display device 20 plot arguments and data set dimensionalities for use by the viewer tool 28 in selecting, extracting, and plotting data for viewing (Step 104). Consequently, after selecting a desired plot type, the desired plot arguments and the data set dimensionalities, the viewer tool 28 generates a plot of the selected data in the selected plot type and displays the plot or plots on display device 20 (Step 106).

Figure 7:
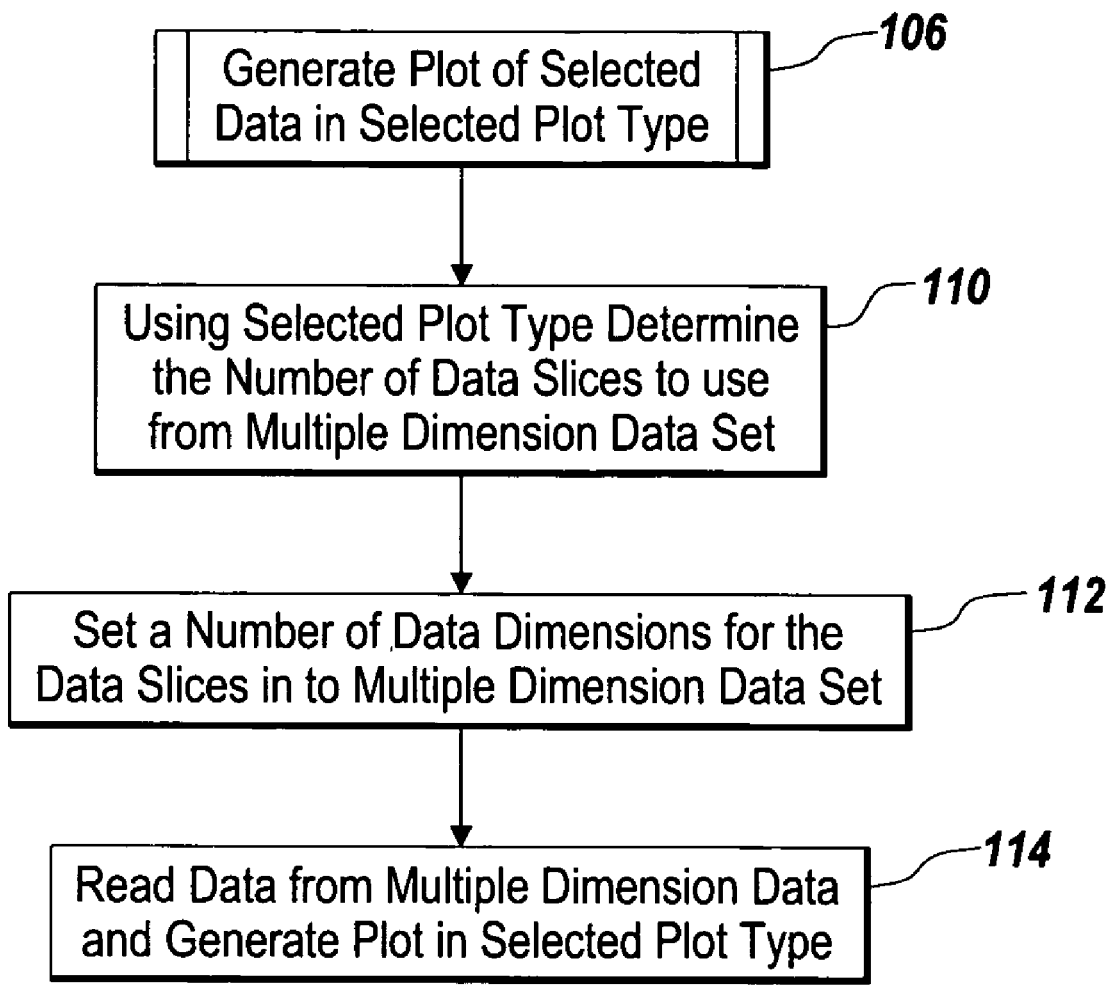
FIG. 7 is a more detailed flow diagram of the flow chart illustrated in FIG. 6.
Figure 8A:
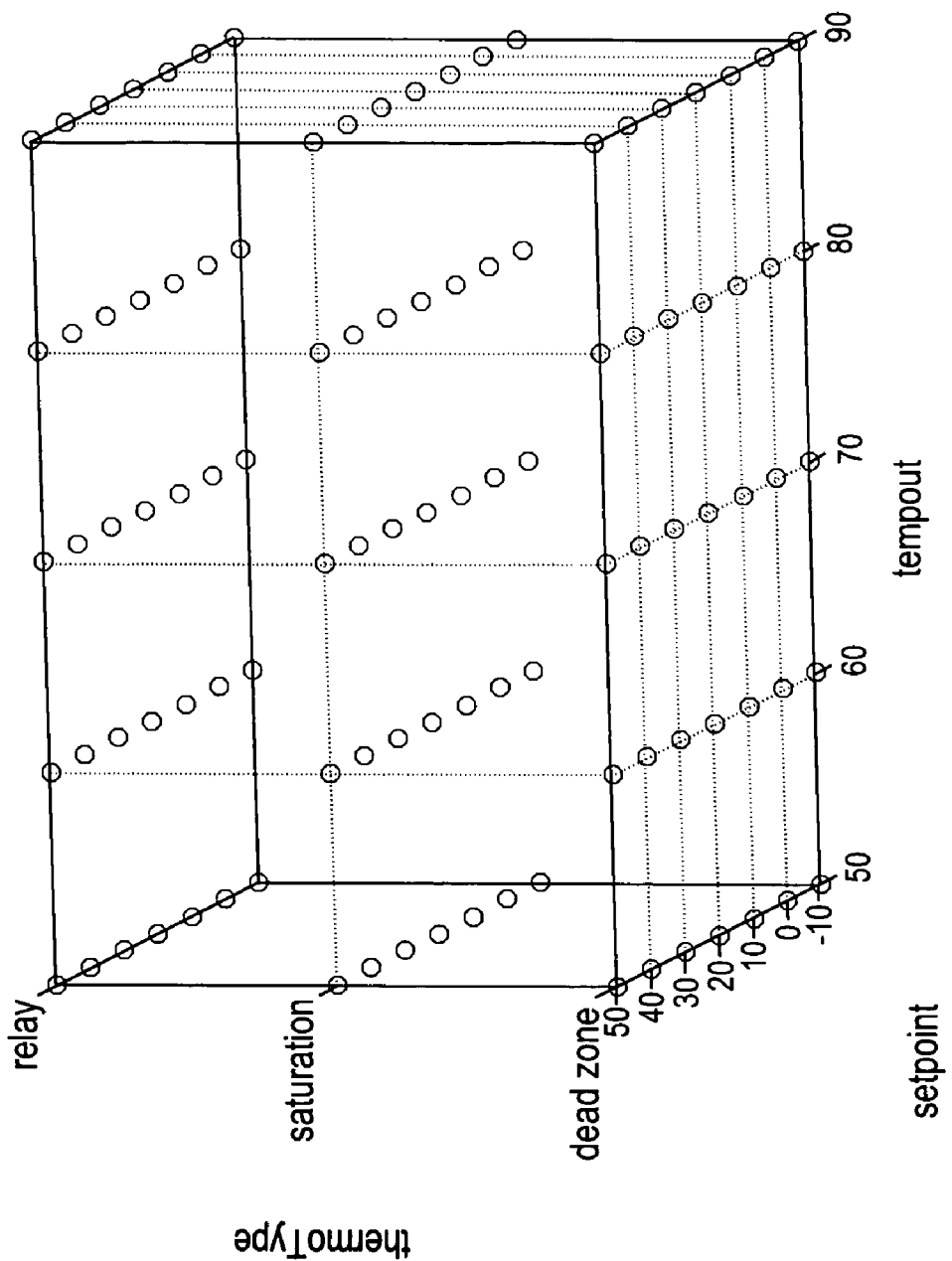
FIGS. 8A-8C depict exemplary data sets suitable for use with the illustrative embodiment of the present invention.
Figure 8B:
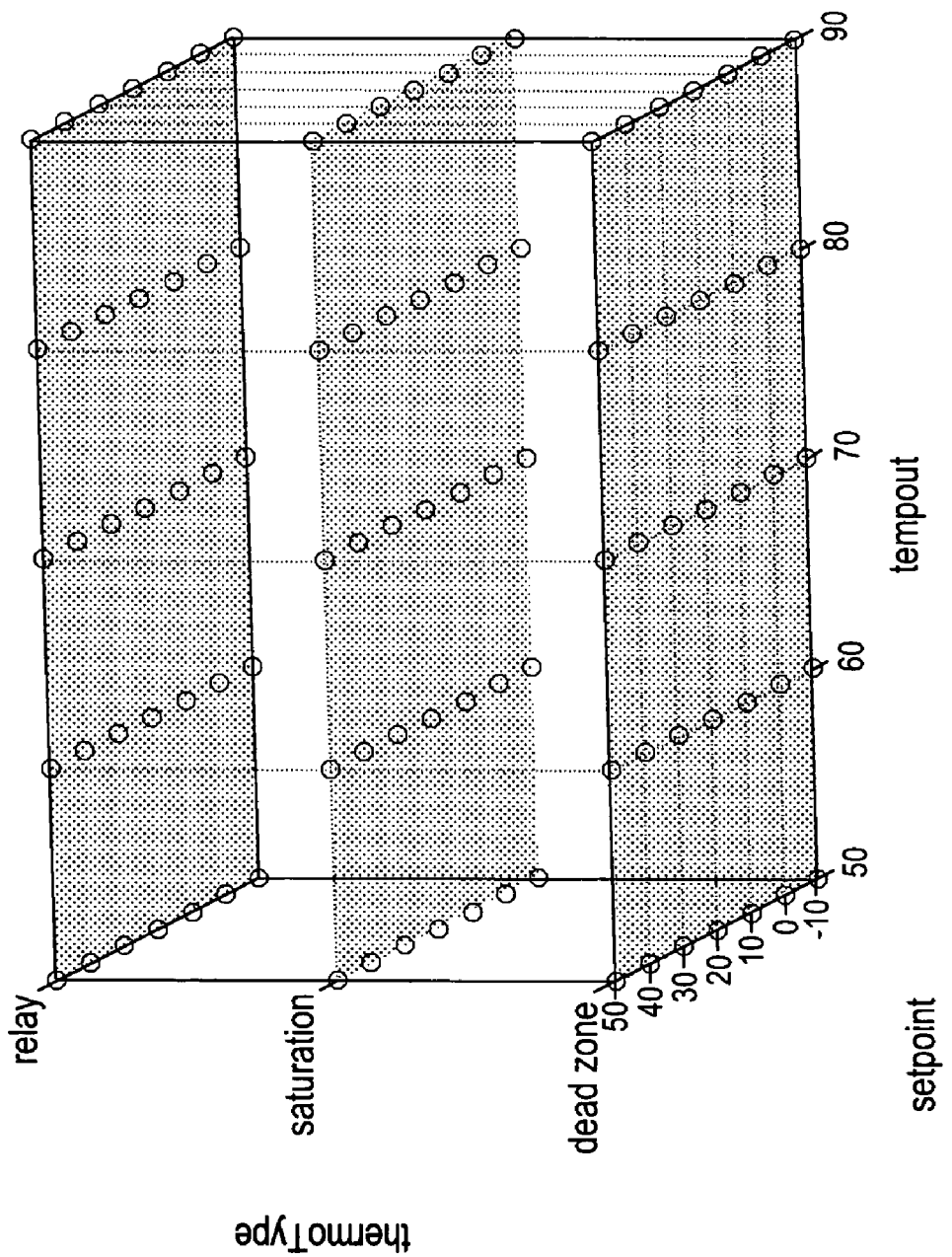
Figure 8C:
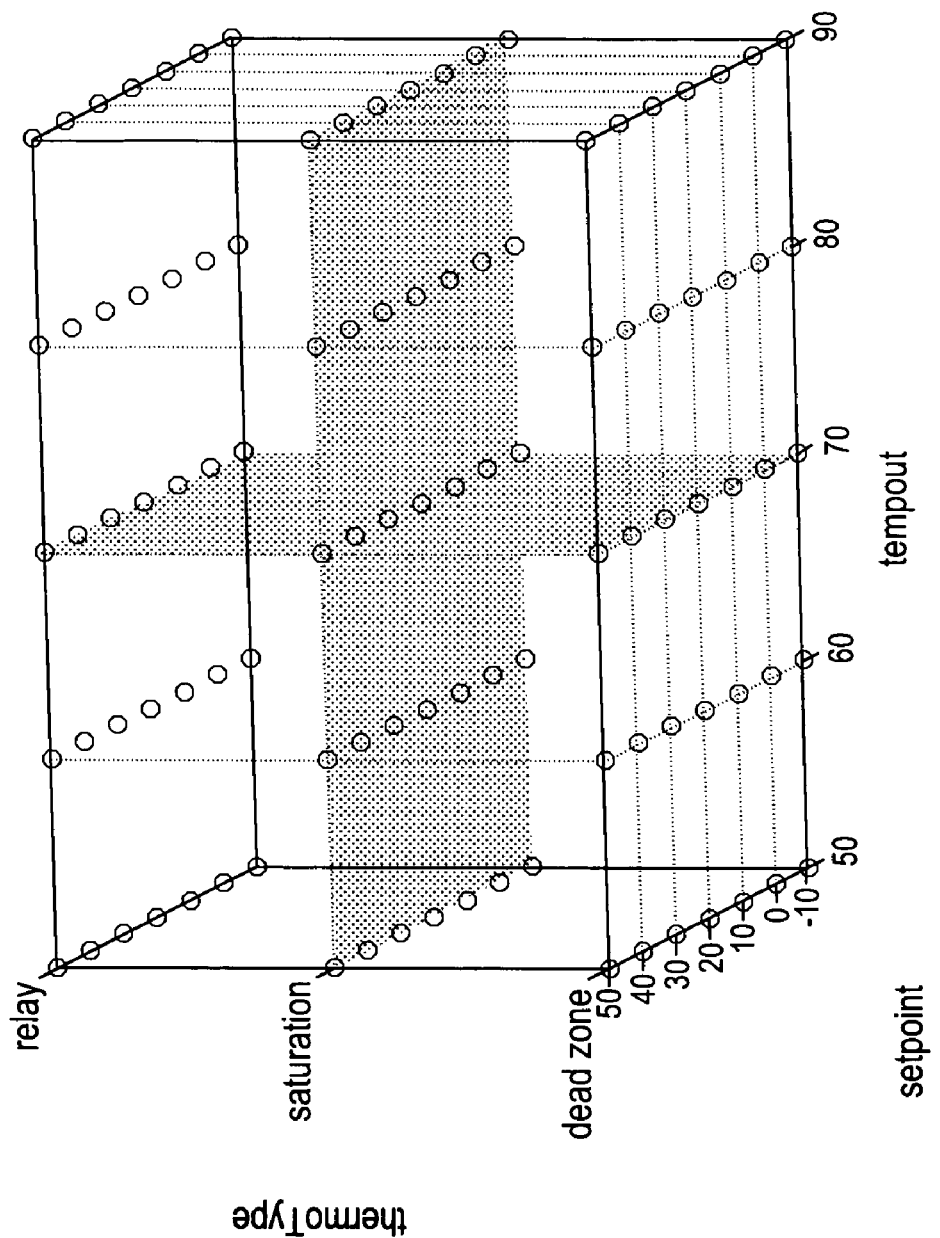

FIG. 7 illustrates the steps taken to generate the plot of the selected data in the selected plot type. The viewer tool 28 receives via user interface 30 the plot type selected by the user and determines the number of data slices to use for extracting data from the data set 36 in order to plot data in the selected plot type (Step 110). The viewer tool 28 can register with itself or with a registry file in the storage device 22, the number of data slices required to plot data in the selected plot type. For example, in a data set with "N" dimensions a line plot would require the viewer tool 28 to slice or hold fixed "N−1" dimensions to result in a one-dimensional data set. In similar fashion, a surface plot requires the viewer tool 28 to slice or hold fixed "N−2" dimensions of the data set 36, and a volumetric plot requires the viewer tool 28 to slice or hold fixed "N−3" dimensions of the data set 36. In addition, the viewer tool 28 is able to recognize the number of data dimensions in the data set 36, for example three data dimensions along three different axes, and subtract from the number of data dimensions of the data set the number of data dimensions required by the selected plot type to determine the number of slices required to extract data from the data set 36.

Thus, the viewer tool 28 upon determining the number of data slices required to plot the data in the selected plot type slices the data set as required in at least one fixed dimension (Step 112). The viewer tool 28 sets the number of dimensions for the data slice or data slices based on input from the user received via the user interface 30. As such, a user can set a single break point along an axis of the data set 36 and the viewer tool 28 slices the data set 36 using the one set or fixed dimensionality of the data slice while leaving the other dimensionalities open or floating. The viewer tool 28 then reads or extracts data from the data set 36 based on the number of data slices taken to support the plot in the selected plot type and, in turn, generates the plot in the selected plot type for display on the display device 20 (Step 114).

The viewer tool 28 is capable of slicing, extracting, and plotting data from an incomplete or partially complete data set. For example, if the viewer tool 28 slices the data set 36 and determines data is absent at selected points or cells viewer tool 28 can use the just prior point or cell and the just post point or cell and extrapolate between the two points or cells to determine a speculative value for the missing data. Alternatively, the viewer tool 28 upon determining a slice of the data set 36 is missing data can still generate the selected plot and leave portions of the plot blank or free of data at locations representing the missing data in the data set 36. In this manner, the generated plot may have blank portions or broken portions representing the missing data. Moreover, the viewer tool 28 can automatically, for example, each time data is written into the data set 36, or at the request of the user refresh the plot at a desired interval.

FIGS. 9-13 show various screen shots of the user interface 30 and will be used to illustrate an illustrative embodiment of the viewer tool 28 from a user's perspective. Those skilled in the art will recognize that the user interface screenshots depicted in FIGS. 9-13 are merely illustrative and can be depicted in a number of suitable manners.

FIG. 9 depicts an exemplary screen shot of a window rendered on the display device 20 by the viewer tool 28 in conjunction with user interface 30. Upon initialization of the user interface 30 and the viewer tool 28, or at any time thereafter, a window 120 is rendered on the display device 20. Window 120 includes a number of graphical user interface elements including plot work area 124 for displaying a generated plot 126, pull-down or drop-down plot type menu 122 used by the user to select a desired plot type for viewing selected data in plot work area 124. Plot work area 124 is used by the viewer tool 28 for displaying data extracted from the data set 36 according to various input parameters to the viewer tool 28 selectable by the user of system 10. Window 120 also provides a legend for use by the user to identify the data displayed in the plot work area 124.

Figure 10:
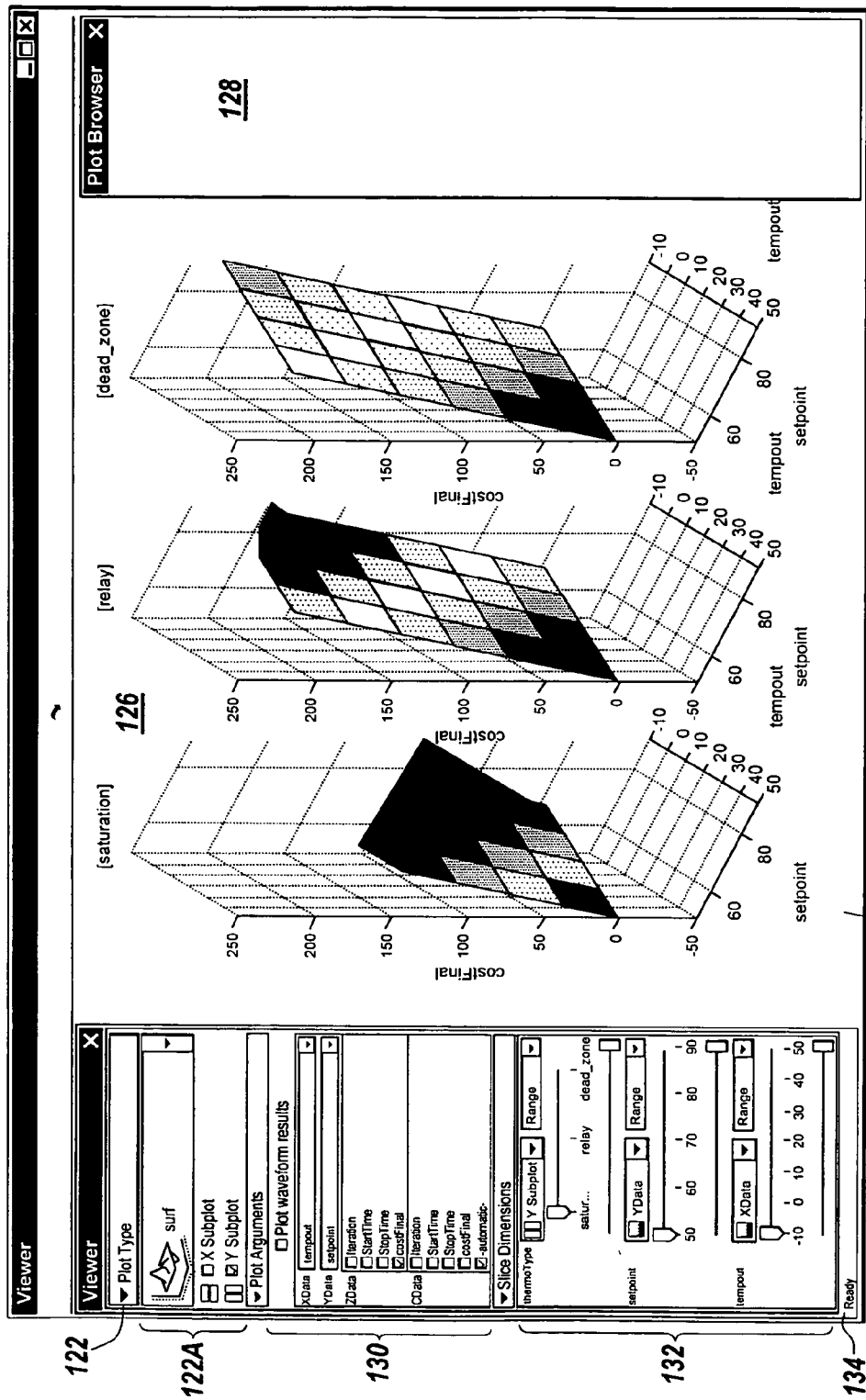

FIG. 10 depicts another screen shot of exemplary window 120 as displayed on a display device 20 in conjunction with user interface 30. Window 120 further includes checkbox elements 122A, plot arguments window 130, slice dimensions window 132, and status window 134. Checkbox elements 122A allow a user to select and prepare the plot work area 124 to plot the selected data in sub-windows. For example, in FIG. 10, the Y subplot checkbox is selected and the plot work area 124 provides three sub-windows to plot the data labeled saturation, the data labeled relay, and the data labeled dead-zone. The saturation data, the relay data, and the dead-zone data all lie in a two dimensional page or matrix of data stacked in vertical fashion along the Y-axis in the data set 36. Correspondingly each two dimensional page of data includes a Y-axis associated with data labeled "setpoint" and an X-axis associated with data labeled "range". Those skilled in the art will appreciate the user can select the checkbox for the X subplot and in response the viewer tool 28 sub-divides and prepares the plot work area 124 so that the various X data sub-plots are plotted in each sub-window.

FIG. 10 illustrates the capability of the viewer tool 28 to plot non-scalar data. The three exemplary subplots in the plot work area 124 represent non-scalar data at the selected nodal points in the data set 36.

Plot arguments window 130 includes graphical user interface elements to allow a user to select input parameters to the viewer tool 28. As depicted, plot arguments window 130 includes a pull-down window for X-data, a pull-down window for Y-data, and check boxes for Z-data and color data or C-data. The pull-down windows for the X-data and the Y-data represent independent parameters selectable by the user for passing to the viewer tool 28. The check boxes associated with the Z-data and the C-data represent dependent parameters selectable by to user for passing to viewer tool 28. For example, "Iteration", "StartTime", StopTime", and "costFinal" are dependent parameters of Z-data. Each dependent parameter can represent one or multiple dimension data sets (not illustrated) associated with the data set 36. Moreover, in FIG. 10, a surface plot is selected in plot type menu 122 and as such, the viewer tool 28 in conjunction with user interface 30 allows a user of system 10 to select three dimensions of data (x, y, z) for use by the viewer tool 28 in plotting the selected surface plot.

Slice dimensions window 132 includes a number of graphical user interface elements for use in controlling how the viewer tool 28 slices the data set 36. Slice dimensions window 132 includes a number of drop-down menus, slide bars, and scrollable check box lists for use in instructing the viewer tool 28 on navigating the data set 36. For example, in FIG. 10, the viewer tool 28 is being controlled to sub-divide plot work area 124 and plot thermoType data across a range defined by saturation data, relay data, and dead zone data. The viewer tool 28 is also being controlled to plot setpoint data along the Y-axis of each sup-plot between a range of negative fifty (−50) and ninety (90) and to plot tempout data along the X-axis of each sup-plot from a range of negative ten (−10) to fifty (50).

In FIG. 10, the user via user interface 30 provides the viewer tool 28 with arbitrary data dimension limits with regard to extraction of thermoType data. That is, the user selected a range for the saturation data which is arbitrary and undefined to the viewer tool 28. Nevertheless, the viewer tool 28 slices the data set 36 at the desired location by continuing to search along the breakpoint or index associated with saturation until it cannot identify any other cells or nodal points in the multiple dimension data set associated with the desired location. Other data range values or data dimensionalities understood by the viewer tool 28 and selectable by the user from the slice dimension window 132, include, but are not limited to data across the entire range, a single point, a selected range, and non-contiguous ranges.

Window 120 further includes text window 134 for use in providing a status to the user. The status is used to indicate an operational state of the viewer tool 28 to the user.

FIG. 11 illustrates exemplary window 120 displaying a line plot as selected from the plot type menu 122. FIG. 10 illustrates the ability of the viewer tool 28 to slice the data set 36 at single points, extract the data, and generate a plot for display on the display device 20. As illustrated, the user selected a line plot and is controlling the viewer tool 28 to slice the setpoint data at breakpoints 60, 70 and 80, while selecting all the tempout data. Accordingly, the viewer tool 28 extracts single slices of the two dimensional page of saturation data associated with thermoType data at set points 60, 70, and 80, and plots each data slice in plot work area 124.

Figure 12:
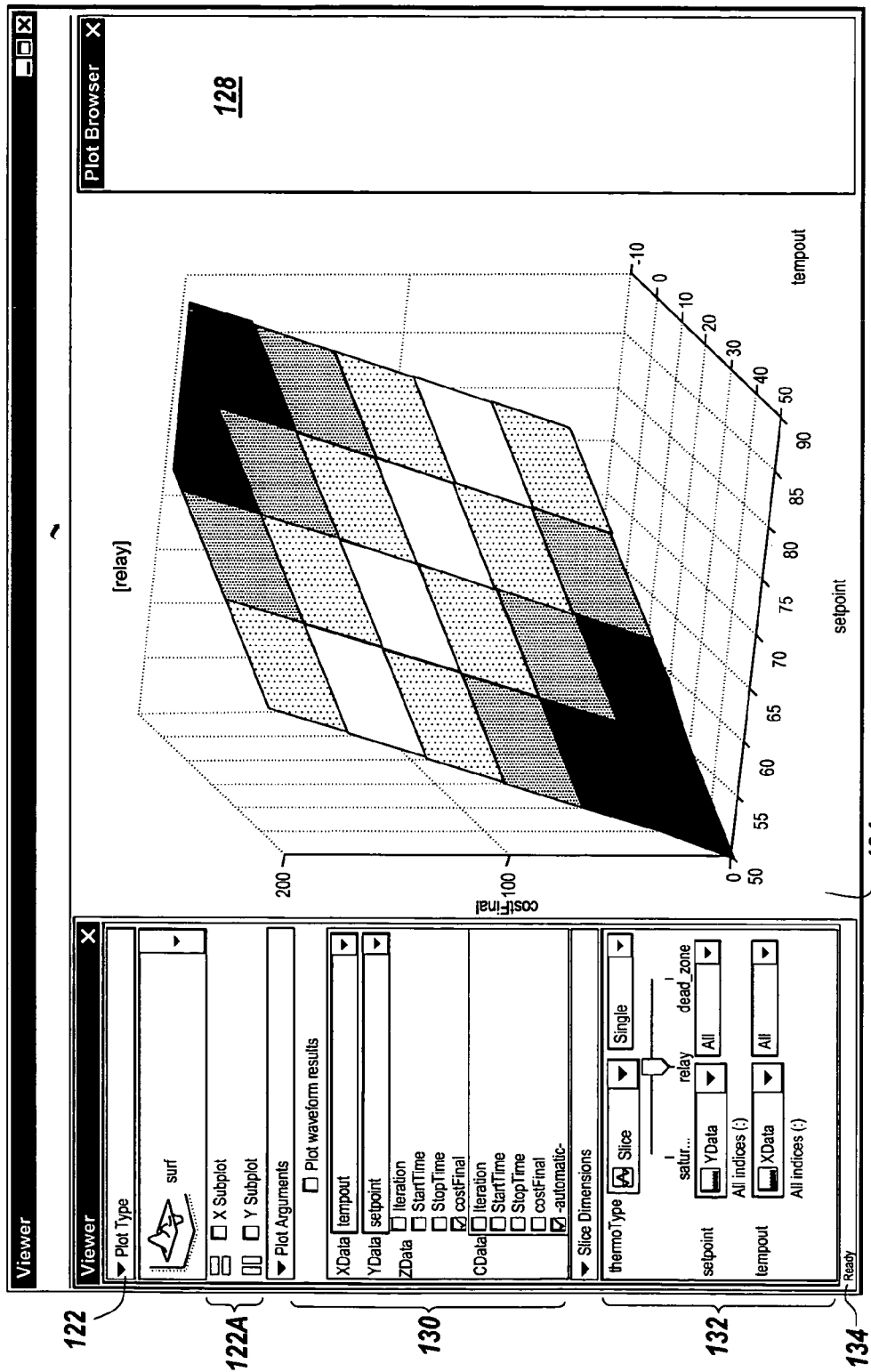

FIG. 12 depicts window 120 with a single surface plot. In FIG. 12 the viewer tool 28 has not sub-divided the plot work are 124 because the user did not select any of the check boxes from window 122A. As illustrated, the user selected a surface plot and is controlling the viewer tool 28 to take a single slice the two dimensional page of relay data associated with the thermoType data, and to slice the setpoint data and the tempout data across the entire range.

Figure 13:
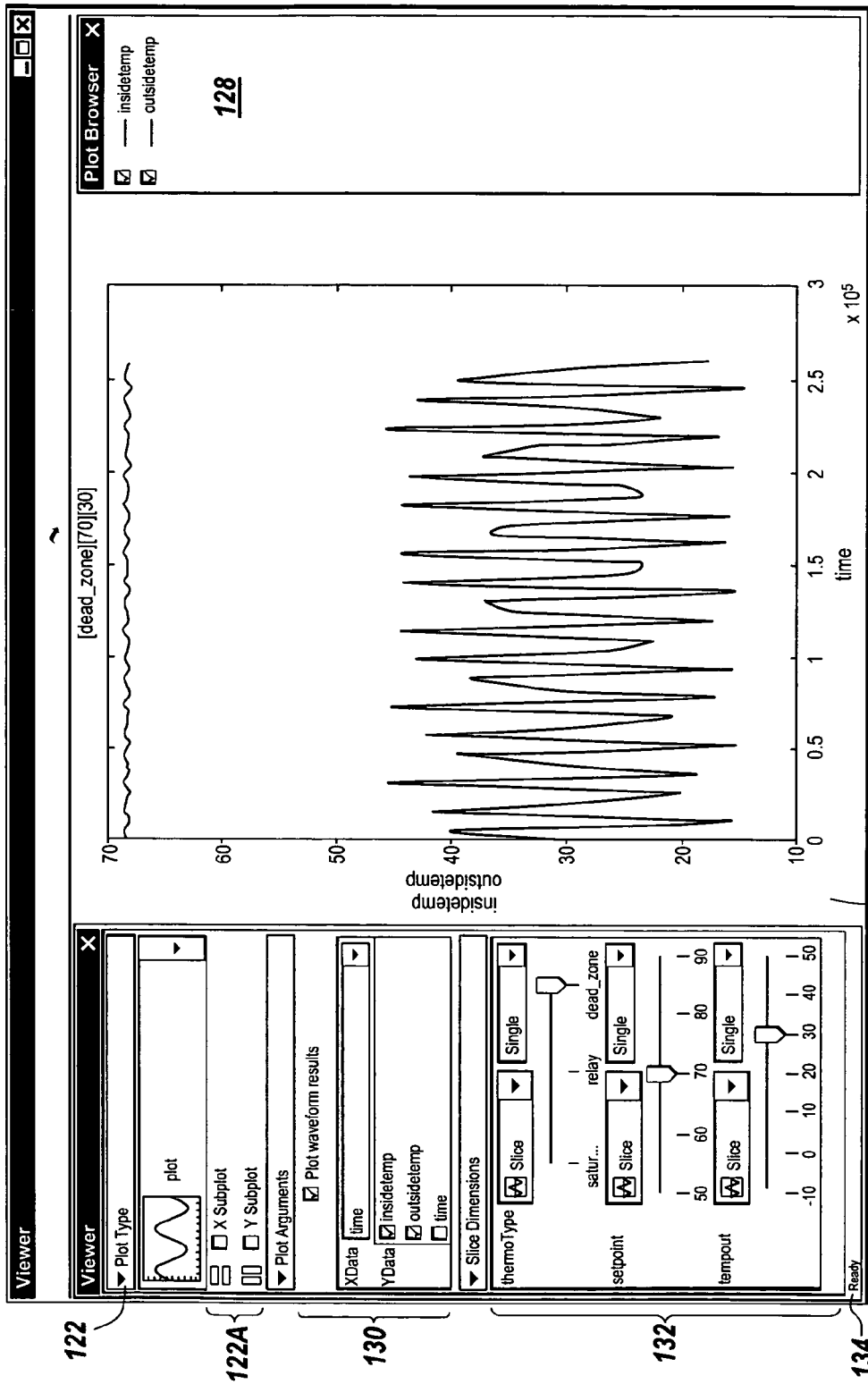

FIG. 13 depicts a line plot as selected in plot type menu 122. FIG. 13 illustrates the ability of a user in conjunction with viewer tool 28 and user interface 30 to navigate within the data set 36 to plot selected data from one or more points. As depicted, the user has selected data for the Y-axis of the plot that corresponds to "insidetemp" and "outsidetemp", and data for the X-axis of the plot that corresponds to time. The user has selected a single slice of thermalType data taken along the index labeled "dead zone" and has further defined two additional sliced planes within the data set 36 at the intersection of a data slice at break point 30 of the data labeled "tempout" and a slice at break point or index value 70, the data labeled "set point".

Those skilled in the art will recognize that the various graphical user interface elements discussed above in FIGS. 9-13 are merely illustrative and are not meant to limit the present invention to the use of those graphical user interface elements. For example, push buttons or radio buttons can be used in place of check boxes or dialog boxes with or without a scrollable feature that can include a scroll box or elevator.

Figure 14:
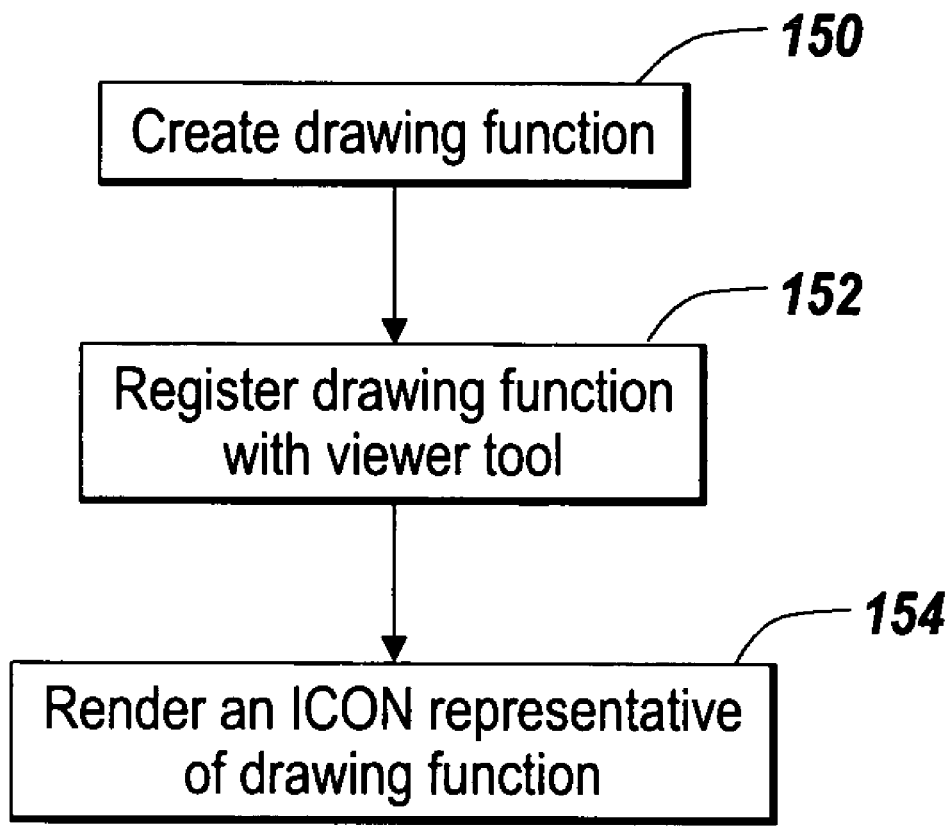
FIG. 14 illustrates a block flow diagram depicting steps taken to configure the viewer tool with a user defined plot schema.

Those skilled in the art will appreciate that viewer tool 28 can include a number of standard plot types having predefined schemas selectable by the user of system 10. Nonetheless, viewer tool 28 is configurable to increase or decrease the number of plot types it is capable of generating. Viewer tool 28, is configurable to include user defined plot types. FIG. 14 illustrates steps taken by a user to configure the viewer tool 28 with a user defined plot schema.

The user of system 10, codes, writes, or loads onto electronic device 12 a function capable of drawing the plot desired by the user for use with the viewer tool 28 (Step 150). One suitable application environment for writing the function is MATLAB® available from MathWorks, Inc. of Natick, Mass. Once the new drawing function is complete, the user registers the user defined plot type with the viewer tool 28 to provide the viewer tool 28 with the following information (Step 152). Information usable by the viewer tool 28 to define a new plot type includes: 1) name of plot; 2) an icon (optional); 3) a command string (e.g., MATLAB® function which performs the plotting); 4) persistence flag (i.e., can data values be set once drawn, or does the entire command need to be rerun to change the data); and 5) an array of arguments. For each argument, there can be the following information: 1) an argument name; 2) an argument type (i.e., dependent/independent/display); 3) an optional flag (e.g., can the argument be omitted); 4) an axis association (i.e., associates the argument with specific axis of the canvas, allowing for automatic generation of ticks, tick labels, and axis headers); and 5) expected dimensionality of the data provided to the argument (e.g., vector, surface, volume, etc). The viewer tool 28 in conjunction with user interface 30 displays a selectable icon representing the user defined plot type in plot type menu 122 (Step 154).

The present has been described with reference to an illustrative embodiment thereof, one skilled it the art will appreciate that there are changes in form and detail that may be made without departing from the intended scope of the present invention as defined in the pending claims. For example, the viewer tool of the present invention is well suited for use in viewing data from a one-dimensional data set such as, a linear data set. Moreover, those skilled in the art will appreciate that the user interface window is depicted in FIGS. 8-12 can be built using standard Microsoft graphical program components, such as those found in Visual Basic.

What is claimed is:

1. A method comprising:
   receiving, using a computer, a plot type for viewing data from a data set, the data set containing non-scalar data representing a physical system obtained from a graphical model of the physical system;
   generating, using the computer, a data section from the data set by slicing the data set using a fixed dimension and leaving the other dimensions of the data set open;
   selecting, using the computer, data from the data set for display on a display device associated with the computer, the data being selected based on the plot type and the data section; and
   visually displaying the selected data on the display device in the plot type.

2. The method of claim 1, wherein selecting data from the data set further comprises:
   determining, using the computer, a plurality of data sections from the data set for use in creating the selected plot type.

3. The method of claim 2 further comprising:
   defining, using the computer, at least one dimension of at least one of the data sections with a selected value to identify at least a portion of the one data section.

4. The method of claim 2, wherein at least one data section includes at least one dimension having an arbitrary value.

5. The method of claim 2, wherein determining further comprises:
   selecting, using the computer, a range of data from at least one of the data sections.

6. The method of claim 2, wherein determining further comprises:
   selecting, using the computer, all data from at least one of the data sections.

7. The method of claim 2, wherein determining further comprises:
   selecting, using the computer, non-contiguous portions of at least one of the data sections.

8. The method of claim 2, wherein determining further comprises:
   selecting, using the computer, a single data point from one of the data sections.

9. The method of claim 1, wherein the graphical modeling environment includes a test executive for use in managing execution of code used for testing an operational feature of a unit under test.

10. The method of claim 1, wherein the data set comprises a multiple dimension having a grid like structure with a plurality of nodal points representing data spaced apart in two or more dimensions.

11. The method of claim 1, wherein the data set comprises a multiple dimension having a cell like structure.

12. The method of claim 1, wherein receiving a plot type further comprises:
   receiving, using the computer, an array of arguments, the arguments defining the plot type for use in plotting the data; and
   storing, using the computer, the array of arguments in a storage device.

13. A method comprising:
   selecting, using a computer, a plot type for viewing data from a data set, the data set containing data representing a physical system obtained from a graphical model of the physical system;
   determining, using the computer, a subset of the data set for use in viewing the data based on the plot type selected, the subset being defined by a plurality of dimensions of the subset including at least one dimension defined by an undefined or arbitrary value, the determining including searching along a breakpoint or an index associated with data in the at least one dimension until a cell or nodal point associated with the definition of the plurality of dimensions cannot be identified;
   generating, using the computer, a plot of the subset of the data set based on the selected plot type; and
   visually displaying the plot on a display device associated with the computer.

14. The method of claim 13, wherein the data set comprises a multiple dimension having a grid like structure with a plurality of nodal points spaced apart in at least two dimensions.

15. The method of claim 14, wherein at least one of the nodal points includes a representation of non-scalar data.

16. The method of claim 13, wherein the determining a subset further comprises:
   selecting, using the computer, at least one coordinate location in the data set based on at least one input parameter to a viewer tool.

17. The method of claim 16, wherein the at least one coordinate defines a plane in the data set.

18. The method of claim 16 further comprising:
   displaying, using the computer, status information to a user on the display device, the status information informing the user of a state of an operation being performed by the viewer tool.

19. The method of claim 17 further comprising:
   displaying, using the computer, a legend for identifying one or more plots on the display device.

20. The method of claim 13, wherein the data set comprises a multiple dimension having a cell like structure.

21. The method of claim 13, wherein displaying further comprises:
   generating, using the computer, the plot in the selected plot type for rendering on the display device.

22. The method of claim 21, wherein generating the plot further comprises:
   generating, using the computer, the plot of the data in the selected plot type if one or more values are absent from one or more locations in the selected data.

23. The method of claim 22 further comprising:
   regenerating, using the computer, the plot of the data in the selected plot type upon the data set receiving updated data.

24. A system for use in practicing a technical computing environment, the technical computing environment for developing and performing engineering and scientific related functions, the system comprising:
   a processor configured to:
      receive input for generating a user-defined drawing function for a new plot type,
      receive input for generating a plot of data selected from a data set in the new plot type, the data set containing data representing a physical system obtained from a graphical model of the physical system,
      generate the user-defined drawing function for the new plot type, select data from the data set based on the new plot type, and generate the plot of data from the data selected from the data set based on the new plot type; and a display device for displaying the plot of data selected from the data set in the new plot type.

25. The system of claim 24, wherein the data set comprises a multiple dimension having a gridded format with a plurality of grid nodes and at least one of the plurality of grid nodes represents non-scalar data.

26. The system of claim 24, further comprising:
an input device to allow the user to provide the input using a user interface displayed on the display device.

27. The system of claim 26, wherein the user interface allows the user to select at least one independent input parameter, the at least one independent input parameter having a value independent of one or more other parameters associated with the data set.

28. The system of claim 26, wherein the user interface allows the user to select at least one dependent input parameter, the dependent input parameter having a value dependent on one or more other parameters associated with the data set.

29. The system of claim 24, wherein the data set comprises a multiple dimension having a cell based format.

30. A computer-readable medium storing computer-executable instructions, the instructions when executed in a processor of a computer causing the computer to perform a method, the method comprising:
selecting a plot type for viewing data from a partially-populated or incomplete data set in which data is absent at selected locations, the data set containing data representing a physical system obtained from a graphical model of the physical system;
determining a number of data slices required to plot data in the selected plot type;
slicing the data set in at least one fixed dimension based on the number of data slices;
selecting the data from the data set as data for display on a display device associated with the computer, the selecting based on the data set slicing;
displaying the data in the selected plot type on the display device; and
updating the display of the data in the selected plot type on the display device at a desired interval or at the request of a user to reflect any change in the data in the partially-populated or incomplete data set.

31. The computer-readable medium of claim 30, wherein the method further comprises:
determining a number of data sections from the data set for use in creating the selected plot type.

32. The computer-readable medium of claim 31, wherein the method further comprises:
defining at least one dimension of at least one of the data sections with a selected value to identify at least a portion of the one data section.

33. The computer-readable medium of claim 31, wherein at least one data section includes at least one dimension having an arbitrary value.

34. The computer-readable medium of claim 31, wherein the method further comprises:
selecting a range of data from at least one of the data sections.

35. The computer-readable medium of claim 31, wherein the method further comprises:
selecting all data from at least one of the data sections.

36. The computer-readable medium of claim 31, wherein the method further comprises:
selecting non-contiguous portions of at least one of the data sections.

37. The computer-readable medium of claim 31, wherein the method further comprises:
selecting a single data point from one of the data sections.

38. The computer-readable medium of claim 31, wherein the data set comprises a multiple dimension having a grid like structure with a plurality of nodal points representing data spaced apart in two or more dimensions.

39. The computer-readable medium of claim 38, wherein at least one of the plurality of nodal points represents non-scalar data.

40. The computer-readable medium of claim 38, wherein at least one of the plurality of nodal points represents scalar data.

41. The computer-readable medium of claim 30, wherein the data set comprises a multiple dimension having a cell like structure.

42. The computer-readable medium of claim 41, wherein the cell like structure can hold scalar data.

43. The computer-readable medium of claim 41, wherein the cell like structure can hold non-scalar data.

44. A computer-readable medium storing computer-executable instructions, the instructions when executed in a processor of a computer causing the computer to perform a method, the method comprising:
selecting a plot type for viewing data from a data set of a first number of dimensions, the data set containing data representing a physical system obtained from a graphical model of the physical system;
determining a data slice of a second number of dimensions based on the plot type selected, the second number of dimensions being lower than the first number of dimensions;
generating the data slice by slicing the data set using a fixed dimension and leaving the other dimensions of the data set open;
determining a subset of the data set for use in viewing the data based on the data slice;
generating a plot of the subset of the data set in the plot type selected; and
displaying the plot on a display device associated with the computer.

45. The computer-readable medium of claim 44, wherein the data set comprises a multiple dimension having a grid like structure with a plurality of nodal points spaced apart in at least two dimensions.

46. The computer-readable medium of claim 45, wherein at least one of the nodal points includes a representation of non-scalar data.

47. The computer-readable medium of claim 44, wherein the method further comprises:
selecting at least one coordinate location in the data set based on at least one input parameter to a viewer tool.

48. The computer-readable medium of claim 47, wherein the at least one coordinate defines a plane in the data set.

49. The computer-readable medium of claim 48, wherein the method further comprises:
displaying status information to a user, the status information informing the user of a state of an operation performed by the viewer tool.

50. The computer-readable medium of claim 48, wherein the method further comprises:
displaying a legend for identifying one or more plots.

51. The computer-readable medium of claim 44, wherein the data set comprises a multiple dimension having a cell like structure.

* * * * *

UNITED STATES PATENT AND TRADEMARK OFFICE
CERTIFICATE OF CORRECTION

PATENT NO.         : 7,605,814 B1                                                    Page 1 of 1
APPLICATION NO.    : 10/925780
DATED              : October 20, 2009
INVENTOR(S)        : David Karl Critz It is certified that error appears in the above-identified patent and that said Letters Patent is hereby corrected as shown below:

At Column 4, Line 18 of the printed patent, "depict an exemplary windows" should be --depict exemplary windows--.

Signed and Sealed this

Fifth Day of January, 2010

David J. Kappos
*Director of the United States Patent and Trademark Office*